US011486129B1

(12) United States Patent
Garvey

(10) Patent No.: US 11,486,129 B1
(45) Date of Patent: Nov. 1, 2022

(54) GEODESIC FRAME CONNECTOR SYSTEM AND METHOD

(71) Applicant: Michael E. Garvey, Schereville, IN (US)

(72) Inventor: Michael E. Garvey, Schereville, IN (US)

( * ) Notice: Subject to any disclaimer, the term of this patent is extended or adjusted under 35 U.S.C. 154(b) by 0 days.

(21) Appl. No.: 16/922,478

(22) Filed: Jul. 7, 2020

(51) Int. Cl.
*E04B 1/19* (2006.01)
*F16B 2/04* (2006.01)
*F16B 5/06* (2006.01)

(52) U.S. Cl.
CPC .............. *E04B 1/1909* (2013.01); *F16B 2/04* (2013.01); *F16B 5/0614* (2013.01); *E04B 2001/1924* (2013.01); *E04B 2001/1957* (2013.01); *E04B 2001/1981* (2013.01)

(58) Field of Classification Search
CPC ........... E04B 1/1909; E04B 2001/1924; E04B 2001/1957; E04B 2001/1981; F16B 2/04; F16B 5/0614
See application file for complete search history.

(56) References Cited

U.S. PATENT DOCUMENTS

| | | |
|---|---|---|
| 1,973,536 A | 9/1934 | Mack |
| 2,682,235 A | 6/1954 | Fuller |
| 2,850,304 A * | 9/1958 | Wagner .................... E04G 7/20 411/959 |
| 2,980,215 A | 4/1961 | Englund |
| 3,325,958 A | 6/1967 | Moore |
| 3,484,830 A * | 12/1969 | Wagner ................ F16B 7/0413 285/397 |
| 3,945,160 A | 3/1976 | Grosser |
| 4,115,966 A | 9/1978 | DeLee |
| 4,233,656 A | 11/1980 | Shemitz |
| 4,343,117 A | 8/1982 | Shemitz |
| 4,676,043 A * | 6/1987 | Grimm ................. E04B 1/1903 403/171 |
| 4,705,423 A * | 11/1987 | Smith ....................... F16B 7/20 403/240 |
| 4,859,109 A * | 8/1989 | Targetti ................ F16B 7/0413 403/362 |

(Continued)

FOREIGN PATENT DOCUMENTS

| | | | |
|---|---|---|---|
| EP | 2136009 A2 * | 12/2009 | ............... E04B 1/19 |
| GB | 2281083 A | 2/1995 | |

*Primary Examiner* — James M Ference
(74) *Attorney, Agent, or Firm* — Paul Barenie, Esq.

(57) ABSTRACT

A geodesic frame connector system for a geodesic frame and method are provided comprising a first discontinuous ring having a first discontinuous ring upper and lower faces, the first ring upper face including an opening extending through the first discontinuous ring, and having inner and outer ring perimeters. A second discontinuous ring is provided having second discontinuous ring upper and lower faces, and inner and outer ring perimeters, and a fastener is provided having a cross section smaller than the opening. When one of the first discontinuous ring lower face and upper face is placed adjacent one of the second discontinuous ring lower face and upper face, insertion of the fastener in the opening of the first discontinuous ring causes the fastener to contact the second discontinuous ring, thereby forcing the second discontinuous ring away from the first discontinuous ring.

19 Claims, 11 Drawing Sheets

(56) References Cited

U.S. PATENT DOCUMENTS

| | | | | |
|---|---|---|---|---|
| 4,872,629 A * | 10/1989 | Cothran | ............... | F16B 2/04 |
| | | | | 248/231.91 |
| 5,354,589 A | 10/1994 | Wass | | |
| 5,549,408 A * | 8/1996 | Lo | ............... | F16B 7/0486 |
| | | | | 403/174 |
| 5,642,957 A * | 7/1997 | Lange | ............... | F16B 7/0413 |
| | | | | 403/292 |
| 5,657,604 A * | 8/1997 | Malott | ............... | F16B 7/0473 |
| | | | | 403/255 |
| 5,797,695 A * | 8/1998 | Prusmack | ............... | E04H 15/48 |
| | | | | 135/145 |
| 5,996,288 A | 12/1999 | Aiken | | |
| 6,108,984 A * | 8/2000 | Davidson | ............... | E04B 1/3211 |
| | | | | 52/81.3 |
| 6,298,525 B1 | 10/2001 | Margo | | |
| 6,334,284 B1 | 1/2002 | Provitola | | |
| 6,412,232 B1 | 7/2002 | Provitola | | |
| 6,901,714 B2 | 6/2005 | Liapi | | |
| 7,069,699 B2 | 7/2006 | Provitola | | |
| 7,434,359 B2 | 10/2008 | Geiger | | |
| 7,775,916 B1 * | 8/2010 | Mahoney | ............... | A63B 63/004 |
| | | | | 403/292 |
| 7,802,404 B2 | 9/2010 | Wolfram | | |
| 7,815,389 B2 * | 10/2010 | Wagner | ............... | F16B 7/0413 |
| | | | | 403/397 |
| 7,886,406 B2 | 2/2011 | Chang | | |
| 7,992,353 B2 | 8/2011 | Athan | | |
| 8,820,006 B2 | 9/2014 | Zook | | |
| 9,157,235 B1 * | 10/2015 | Garvey | ............... | E04B 1/3211 |
| 2003/0101663 A1 * | 6/2003 | Boots | ............... | E04B 1/3211 |
| | | | | 52/81.3 |
| 2003/0226319 A1 * | 12/2003 | Richards | ............... | E04B 1/3211 |
| | | | | 52/80.1 |
| 2005/0008431 A1 * | 1/2005 | Albaugh | ............... | F16B 2/04 |
| | | | | 403/368 |
| 2006/0291952 A1 * | 12/2006 | Wood | ............... | E04B 1/3211 |
| | | | | 403/217 |
| 2007/0031187 A1 * | 2/2007 | McNeal | ............... | F16B 2/04 |
| | | | | 403/297 |
| 2007/0206989 A1 * | 9/2007 | Wagner | ............... | E04F 11/1836 |
| | | | | 403/292 |
| 2010/0139202 A1 * | 6/2010 | Athan | ............... | E04B 1/19 |
| | | | | 52/745.19 |
| 2015/0275515 A1 * | 10/2015 | Garvey | ............... | E04B 1/3211 |
| | | | | 52/81.3 |

* cited by examiner

GEODESIC FRAME CONNECTOR SYSTEM AND METHOD

TECHNICAL FIELD

This disclosure is directed to a structure, and more particularly, to a geodesic frame connector system for a geodesic structure.

BACKGROUND ART

Geodesic domes are rigid geometric structures that provide a large degree of stability while having a high strength to weight ratio. Geodesic dome structures are typically constructed of a frame having struts and hub connectors that are connected to form an interlocking triangle structure.

Hub joints for connecting struts are typically built for a specific shaped structure. Conventional hubs typically are expensive due to machining and fabrication requirements. Geodesic frames typically have many parts and take an undue amount of time to construct.

Geodesic domes may have many different frequencies and strut arrangements. A higher frequency dome has more struts and hub connectors, while providing a smoother dome shape. A lower frequency dome has less struts and connectors while providing a less smooth dome shape. As the frequency of the dome increases, the angle of inclination of the struts to the radial plane of the hub connector decreases. The strut angles of geodesic domes may be dependent on the frequency of the dome. Some hub connectors may vary depending on the number of struts being joined. Conventional geodesic frames typically comprise complex hub connector schemes that increases the complexity and difficulty in assembling the geodesic frame.

One important part of a geodesic frame is the connector, which joins the struts. Many types of hub connectors have been used in geodesic frames. One example is Athan A frame system is described in U.S. Pat. No. 7,992,353 to Athan that utilizes a six-strut hub requiring six pins and six caps to couple six tubular struts and a metal rod. It describes a hub connector made of a metal rod and pin for joining tubular members. A disadvantage of the Athan invention is that it utilizes a hub including many different parts, requiring a user to locate, sort and manipulate the several various components of the frame and hub during the assembly process. Such manipulation can be difficult and intimidating for a user to accomplish. Further, utilizing several such components, here the six pins and six caps per hub joint, requires the user to expend significant time when constructing each joint of the frame.

Another frame system is described in U.S. Pat. No. 7,802,404 to Wolfram in U.S. Pat. No. 7,802,404 describes a hub connector made preferably by cast aluminum. The struts are inserted into designated slots on the hub. The disadvantage in this connector that a hub connector is specific to the number of struts being joined, and can't be interchanged. Further, the hub connector requires many different parts. If a six-strut hub were used with bolts in each aperture, there would be 24 bolts, 24 nuts, 6 struts, and 1 hub connector. To construct a frame, a user of such a system must not only collect the many pieces of hardware for that frame joint, but must also determine and select the appropriate hub configuration to connect the appropriate number of struts at that hub joint.

Another geodesic frame system, described in U.S. Pat. No. 9,157,235 to Garvey, describes a geodesic frame system that uses a discontinuous ring hub connector, where wire is placed through holes in the discontinuous rings to tie the hub connectors together, preventing them from rotating out from the geodesic frame struts.

This invention is directed to solving one or more of the problems discussed above.

SUMMARY

Figure 1:
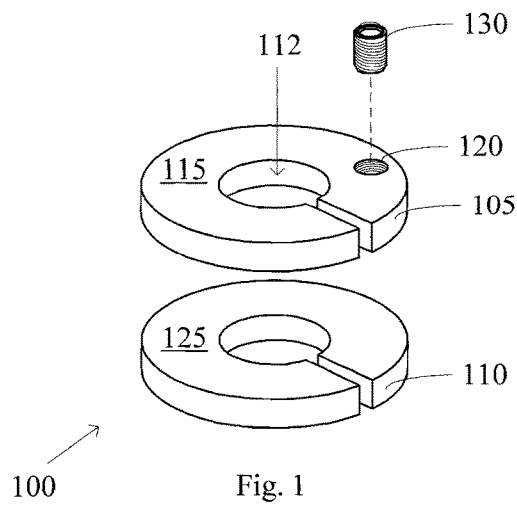
FIG. 1 is an exploded perspective view of a geodesic dome hub connector that may be used in a geodesic framing system, in accordance with an embodiment of the invention.

In one aspect, a geodesic frame connector system for a geodesic frame comprises a discontinuous ring pair comprising a first discontinuous ring and a second discontinuous ring, a first discontinuous ring having a first discontinuous ring upper and lower faces, the first ring upper face including an opening extending through the first discontinuous ring, and having inner and outer ring perimeters. The geodesic frame connector includes a second discontinuous ring, having second discontinuous ring upper and lower faces, and inner and outer ring perimeters, where one of the first discontinuous ring lower face and upper face is placed adjacent one of the second discontinuous ring lower face and upper face such that the first discontinuity and the second discontinuity are substantially aligned to form aligned discontinuities. The geodesic frame connector system further includes a fastener having a cross section smaller than the opening, and at least two elongated struts, each of the at least two elongated struts including a first end and a second end and a strut opening proximate the first end, each strut opening of the at least two elongated struts being greater than a cross section of the discontinuous ring pair and including an upper edge and lower edge. Each of the at least two elongated struts is capable of being rotationally coupled with the discontinuous ring pair by inserting the strut opening of each of the at least two elongated struts through the aligned discontinuities, thereby allowing the at least two elongated struts to be positioned at respective desired positions along the discontinuous ring pair. Insertion of the fastener in the opening of the first discontinuous ring causes the second discontinuous ring to be forced away from the first discontinuous ring, causing the first discontinuous ring upper face to contact the upper edge of each elongated strut opening of the at least two elongated struts, and the second discontinuous ring lower face to contact the lower edge of each elongated strut opening of the at least two elongated struts.

In one embodiment, where the opening in the first discontinuous ring is a round threaded opening, and the fastener has a round cross section and is compatibly threaded, the insertion of the fastener into the opening includes turning the fastener into the opening to cause the fastener to contact the second discontinuous ring, thereby forcing the second discontinuous ring from the first discontinuous ring. In a further embodiment, where the first discontinuous ring upper face includes a plurality of round threaded openings extending through the first ring, and further including a plurality of fasteners each having a round cross section and are compatibly threaded, the turning the fastener includes turning the plurality of fasteners into corresponding threaded openings to cause the plurality of threaded fasteners to contact the second discontinuous ring, thereby forcing the second discontinuous ring from the first discontinuous ring In another embodiment, the opening is a first ring opening, the second discontinuous ring upper face including a second discontinuous ring opening extending through the second discontinuous ring, and where the fastener has a round cross section smaller than the second ring opening and includes first and second ends, the fastener having one of a right-handed and left-handed thread portion proximate the first end, and the other of a right-handed and left-handed thread portion proximate the second end. This embodiment further includes a first separator piece having a face greater than the first ring opening and a first separator opening threaded in a right-handed thread compatible with the right-handed thread of the fastener, and a second separator piece having a face greater than the second ring opening and a second separator opening threaded in a left-handed thread compatible with the left-handed thread of the fastener. The first separator piece and second separator piece are threaded onto respective compatible ends of the fastener and sandwiched between the first and second discontinuous rings with one fastener end extending into the first ring opening and the other fastener end extending into the second ring opening. Insertion of the fastener includes turning the fastener to cause the first and second separator pieces to extend away from one another, threreby contacting corresponding faces of the discontinuous rings to force the first discontinuous ring away from the second discontinuous ring. In a further embodiment, the first separator piece is a first flange nut, and the second separator piece is a second flange nut.

In yet another embodiment, the first discontinuous ring upper face includes a plurality of openings extending through the first ring, with the geodesic frame connector further includes a plurality of fasteners, each having a diameter smaller than a compatible opening of the plurality of openings. Insertion of each of the plurality of fasteners in a compatible opening of the plurality of openings causes the plurality of fasteners to contact the second discontinuous ring, thereby forcing the second discontinuous ring from the first discontinuous ring.

In another embodiment, the fastener has a round cross section and is threaded, and further includes a separator piece sandwiched between the first and second discontinuous rings, the separator piece having a face dimension greater than the diameter of the first ring opening and including a threaded separator opening compatible with the threaded fastener. Insertion of the fastener includes turning the fastener in the separator opening, causing the separator piece to contact the first discontinuous ring while the fastener contacts the second discontinuous ring thereby forcing the second discontinuous ring away from the first discontinuous ring. In a further embodiment, the separator piece extends beyond the outside perimeters of the first and second discontinuous rings. In an alternative further embodiment, the separator piece is a flanged nut, with the nut portion sized to fit within the first ring opening and the flanged portion having a face dimension greater than the diameter of the first ring opening. In this alternative embodiment, the insertion of the fastener into the opening includes turning the fastener into the flanged nut to draw the nut portion into the ring opening with the flanged portion preventing the flanged nut from completely entering the first ring opening, while causing the fastener to contact the second discontinuous ring, thereby forcing the second discontinuous ring from the first discontinuous ring.

In yet another further embodiment, the first ring opening is elongated along a major axis allowing the flanged nut to travel along the major axis without completely entering the first ring opening, where the insertion of the fastener includes positioning the flanged nut to a desired location along the major axis of the first ring opening.

In another embodiment, the first and second discontinuous rings comprise a discontinuous ring pair with one of the first discontinuous ring lower face and upper face is placed adjacent one of the second discontinuous ring lower face and upper face such that the discontinuities are aligned. The geodesic frame connector system further includes at least two elongated struts, each strut including a first end and a second end and a strut opening proximate the first end, each strut opening being greater than a cross section of the discontinuous ring pair and including an upper edge and lower edge. Each elongated strut is capable of being coupled with the discontinuous ring pair, by inserting the strut openings of the at least two elongated struts through the aligned discontinuities of the discontinuous ring pair, rotating the discontinuous ring pair through the respective strut openings and positioning the at least two elongated struts at respective desired positions along the discontinuous ring pair, causing the first discontinuous ring to be forced from the second discontinuous ring that causes the first discontinuous ring upper face to contact the upper edge of each elongated strut opening, and the second discontinuous ring lower face to contact the lower edge of each elongated strut opening.

In a further embodiment, each strut opening is rectangular.

In another further embodiment, the upper and lower edges of each strut opening include a substantially parallel portion proximate the respective elongated strut first end, and an inwardly tapered portion away from the respective elongated strut first end, where insertion of the fastener causes the first discontinuous ring upper face and the second discontinuous ring lower face to become substantially seated within the substantially parallel portions of the elongated strut openings.

In yet another further embodiment, the strut opening of each elongated strut is a first strut opening, and wherein each elongated strut includes a second strut opening proximate the second end, with each second strut opening being greater than a cross section of the discontinuous ring pair and including an upper edge and lower edge.

In another embodiment, the inner perimeter of the first discontinuous ring is substantially the same as the inner perimeter of the second discontinuous ring, and the outer perimeter of the first discontinuous ring is substantially the same as the outer perimeter of the second discontinuous ring.

In another aspect, a geodesic frame connector system for a geodesic frame includes a discontinuous ring pair comprising a first discontinuous ring having a first discontinuous ring upper and lower faces, and a first discontinuous ring inner and outer perimeters and a second discontinuous ring having second discontinuous ring upper and lower faces, and second discontinuous ring inner and outer perimeters, the first discontinuous ring lower face being adjacent the second discontinuous ring upper face, and the inner perimeters of the first and second discontinuous ring pair defining a discontinuous ring pair inner opening. A wedge portion is sandwiched between the lower face of the first discontinuous ring and the upper face of the second discontinuous ring such that the wedge portion extends beyond at least one of the first and second discontinuous ring outer perimeters, the wedge portion having a wedge portion opening extending through the wedge portion along its major axis. A wedge anchor portion is provided, including a threaded wedge anchor opening, inserted in the discontinuous ring pair inner opening with the wedge anchor opening substantially aligned with the wedge portion opening. A fastener is included having a head portion with a cross section greater than the wedge portion opening and a threaded portion compatible with the threaded wedge anchor opening. Further included are at least two elongated struts, each strut including a first end and a second end and a strut opening proximate the first end, each strut opening being greater than a cross section of the discontinuous ring pair and including an upper edge and lower edge. Each elongated strut is capable of being coupled with the discontinuous ring pair, by inserting the discontinuous ring pair through the strut openings of the at least two elongated struts, and insertion of the fastener through the wedge opening and turned through the wedge anchor opening draws the wedge portion toward the wedge anchor portion, thereby causing the first discontinuous ring upper face to contact the upper edge of each elongated strut opening, and the second discontinuous ring lower face to contact the lower edge of each elongated strut opening to separate the first discontinuous ring from the second discontinuous ring.

In a further embodiment, the wedge portion is a first wedge portion, and the wedge anchor portion is a first wedge anchor portion, and the fastener is a first fastener. A second wedge portion is provided, sandwiched between the lower face of the first discontinuous ring and the upper face of the second discontinuous ring such that the second wedge portion extends beyond at least one of the first and second discontinuous ring outside perimeters, the second wedge portion having a second wedge portion opening extending through the wedge portion along its major axis. A second wedge anchor portion including a second threaded wedge anchor opening, is inserted in the discontinuous ring pair inner opening with the second wedge anchor opening substantially aligned with the second wedge portion opening. A second fastener having a second head portion with a cross section greater than the second wedge portion opening and a second threaded portion compatible with the second threaded wedge anchor opening. Insertion of the fastener includes insertion of the second fastener through the second wedge opening and turned through the second wedge anchor opening to draw the second wedge portion toward the second wedge anchor portion.

In yet another aspect, a method for constructing a geodesic frame using a geodesic frame system comprises aligning discontinuities of a first and second discontinuous rings that form a discontinuous ring pair, with the discontinuity exposing a cross section face of the discontinuous ring pair. A first end of a first elongated strut is inserted into the discontinuity of the discontinuous ring pair such that a first elongated strut opening aligns with the cross section face. The method further includes rotating the discontinuous ring pair through the first elongated strut opening, and inserting a first end of a second elongated strut into the discontinuity of the discontinuous ring pair such that a second elongated strut opening aligns with the cross section face. The first and second elongated struts are positioned to desired respective positions along the discontinuous ring pair. Insertion of a fastener into the discontinuous ring pair forces the first discontinuous ring away from the second discontinuous ring, such that a first discontinuous ring upper face contacts an upper edge of each elongated strut opening, and a second discontinuous ring lower face contacts a lower edge of each elongated strut opening.

In one embodiment, the inserting the fastener includes inserting the fastener into an opening of the first discontinuous ring to force the first discontinuous ring away from the second discontinuous ring.

In another embodiment, the inserting the fastener includes inserting the fastener through a wedge portion opening and into a wedge anchor, the wedge portion being sandwiched between the first and second discontinuous rings and the wedge anchor being placed in a discontinuous ring pair inner opening defined by the inner perimeters of the first and second discontinuous ring pair. The Inserting of the fastener draws the wedge portion toward the wedge anchor portion to force the first discontinuous ring from the second discontinuous ring.

DETAILED DESCRIPTION OF THE PREFERRED EMBODIMENT

A geodesic frame connector system for a geodesic structure includes a first discontinuous ring having a first discontinuous ring upper and lower faces, the first ring upper face including an opening extending through the first discontinuous ring, and having inner and outer ring perimeters. A second discontinuous ring is provided, having second discontinuous ring upper and lower faces, and inner and outer ring perimeters, as well as a fastener having a cross section smaller than the opening. When one of the first discontinuous ring lower face and upper face is placed adjacent one of the second discontinuous ring lower face and upper face, insertion of the fastener in the opening of the first discontinuous ring causes the fastener to contact the second discontinuous ring, thereby forcing the second discontinuous ring away from the first discontinuous ring.

In a further embodiment, the first and second discontinuous rings comprise a discontinuous ring pair with one of the first discontinuous ring lower face and upper face is placed adjacent one of the second discontinuous ring lower face and upper face. At least two elongated struts may be provided, each strut including a first end and a second end and a strut opening proximate the first end, each strut opening being greater than a cross section of the discontinuous ring pair and including an upper edge and lower edge. Each elongated strut is capable of being coupled with the discontinuous ring pair, by inserting the discontinuous ring pair through the strut openings of the at least two elongated struts. The first discontinuous ring of the discontinuous ring pair may be forced from the second discontinuous ring, thereby causing the first discontinuous ring upper face to contact the upper edge of each elongated strut opening, and the second discontinuous ring lower face to contact the lower edge of each elongated strut opening.

The geodesic frame connector for a geodesic frame system in at least some embodiments described herein may allow for discontinuous rings to be sandwiched together when inserting in elongated strut opening(s) of the frame system described below, with one or more fasteners being inserted to cause the discontinuous rings of the discontinuous ring pair to separate, thereby securing the discontinuous ring pair within the openings of the elongated struts. As the discontinuous ring pair has a larger effective cross section after insertion of the fastener(s), than before insertion of the fastener(s), the discontinuous ring pair may be more readily and easily inserted into the elongated strut openings, thereby helping to avoid the binding of the discontinuous ring pair within the elongated strut openings during assembly. In some embodiments discussed herein, a partly tapered elongated strut opening may help to provide better alignment of the elongated struts with one another as the fastener(s) is/are inserted.

Various geodesic hub connector configurations are disclosed herein. In some embodiments, a plurality of a single geodesic hub connector configuration may be utilized through an entire geodesic framing system, thereby reducing the complexity of construction as compared with geodesic domes that require many different types of geodesic dome hub connector configurations. In other embodiments, it will be appreciated that multiple geodesic dome hub connector configurations may be used within the same geodesic frame system, where certain geodesic dome hub connector configurations are advantages to use at particular locations of the structure. For example, one type/configuration of geodesic dome hub connector may be desirable where a relatively large number of elongated struts are being coupled, whereas another hub connector configuration may be advantageous where a relatively small number of elongated struts are being coupled. Location within the geodesic structure may render one hub configuration desirable over another, for example, due to ease of installation of the particular geodesic dome hub configuration at that location, or the stability provided by the particular hub connector configuration. In addition or in the alternative, the fastener insertion for one geodesic hub connector configuration may be easier at different locations in the geodesic frame system (i.e., one hub configuration selected for hubs near the ground whereas another may be selected for hubs toward the top of the dome). Other considerations may govern if/whether it is desirable to utilize a single uniform geodesic dome hub connector configuration throughout the entire geodesic structure, or to interchange two or more hub connector configurations throughout.

Various figures will be discussed to describe embodiments of the invention. One skilled in the art will realize that these figures may not necessarily be to scale, and that in some figures, reference numbers may be omitted for the purpose of clarity.

Thus, a geodesic dome hub connector, and in a further embodiment, a plurality of elongated struts, may form a geodesic framing system. The geodesic dome hub connector may include first and second discontinuous rings, that fit within the openings of elongated struts. The insertion of fasteners cause the first and second rings to separate, or be forced from one another, thereby helping them to secure the hub connector from being disengaged from the elongated struts. Various embodiments for the geodesic dome hub connectors (i.e., hub connector configurations) and the elongated struts are described herein. It will be appreciated that such embodiments are not considered to be limiting, but rather, representative of various embodiments of the invention.

Figure 2A:
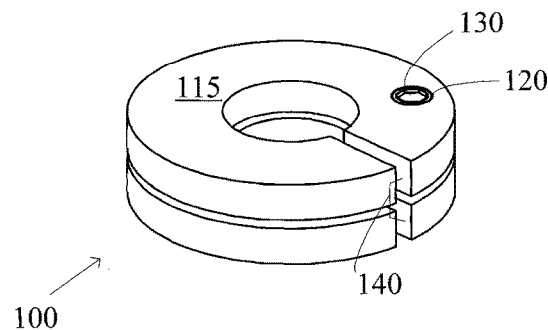
FIGS. 2A and 2B are perspective and front views respectively, of the geodesic frame hub connector of FIG. 1 showing the fastener inserted, in accordance with an embodiment of the invention.
Figure 2B:
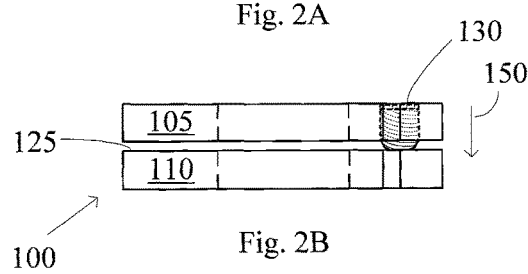

FIG. 1 is an exploded perspective view of a geodesic dome hub connector that may be used in a geodesic framing system, in accordance with an embodiment of the invention. FIG. 2A is a perspective view of the geodesic frame hub connector of FIG. 1, showing the fastener inserted, in accordance with an embodiment of the invention. FIG. 2B is a front view of the geodesic hub connector of FIG. 2A, in accordance with an embodiment of the invention.

Referring to FIGS. 1 and 2A-2B, a geodesic dome hub connector 100 may include a first discontinuous ring 105 and a second discontinuous ring 110. The first and second discontinuous rings may form a discontinuous ring pair, where a discontinuous ring pair opening may be a discontinuous ring pair opening 112 defined by the inside perimeter of the first and second discontinuous rings 105, 110. The first discontinuous ring 105 includes a first discontinuous ring upper face 115, and a first discontinuous ring lower face (hidden). The first discontinuous ring 105 may further include an opening 120. The second discontinuous ring 110 includes a second discontinuous ring upper face 125, and a second discontinuous ring lower face (hidden). The geodesic frame hub connector 100 may further include a fastener 130.

As shown in FIG. 1, the opening 120 may be a threaded opening, and the fastener 130 may be a threaded fastener, having threads compatible with those of the opening 120. Other fastener configurations may instead be used.

Referring to FIGS. 2A-2B, the first discontinuous ring 105 is placed adjacent the second discontinuous ring 110, with the discontinuities in the first and second rings substantially aligned. The discontinuities of the discontinuous ring pair define a discontinuous ring pair cross section, shown at 140, defining an area within the discontinuity from the first ring upper face to the second ring lower face, and from the inner perimeter to the outer perimeter of the ring pair. As shown in FIGS. 2A-2B, the fastener 130 has been inserted into the opening 120, here by turning the fastener into the opening. Turning the fastener 130 into the opening 120 causes the fastener to extend from the lower face of the first discontinuous ring 105, contacting the second discontinuous ring upper face 125, thereby forcing the first discontinuous ring in the direction 150 away from the second discontinuous ring.

Figure 3:
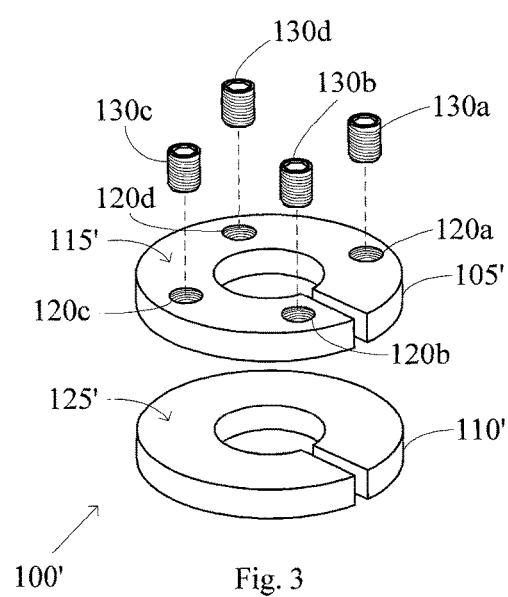
FIG. 3 is an exploded perspective view of a geodesic dome hub connector, in accordance with an embodiment of the invention.
Figure 4A:
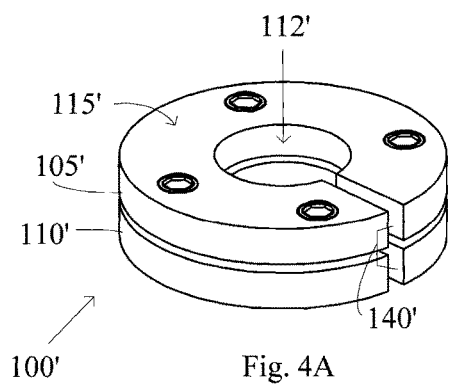
FIGS. 4A-4B show a perspective view and front view of the geodesic dome hub connector of FIG. 3, with the fasteners inserted, in accordance with an embodiment of the invention.
Figure 4B:
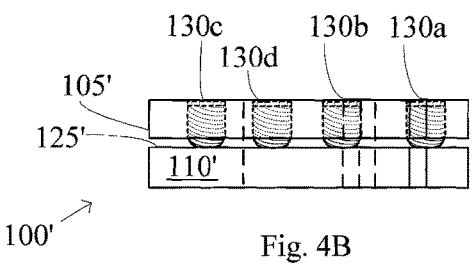

FIG. 3 is an exploded perspective view of a geodesic dome hub connector in accordance with an embodiment of the invention. FIGS. 4A-4B are perspective and front views of the geodesic dome hub connector of FIG. 3, showing the fastener inserted, in accordance with an embodiment of the invention. Elements of FIGS. 3 and 4A-4B having reference numbers used above but designated as a prime, are similar in nature and will not be discussed in detail.

Referring to FIGS. 3 and 4A-4B, the geodesic dome hub connector 100' differs mainly from the geodesic dome hub connector 100 discussed above with reference to FIGS. 1 and 2A-2B, mainly in that the first discontinuous ring 105' includes a plurality of openings in its upper face 115', here four openings 120a, 120b, 120c and 120d. Further, the geodesic hub connector 100' includes a plurality of fasteners, here fasteners 130a, 130b, 130c and 130d. As shown in FIGS. 3 and 4A-4B, the openings 120a-120d may be threaded openings, where the fasteners 130a-130d are threaded fasteners having compatible threading to their respective opening 120a-120d. The fasteners 130a-130d are shown as allen screw fasteners, however other fasteners may be utilized.

Referring to FIGS. 4A-4B, in a similar fashion as discussed with respect to FIGS. 2A-2B, as the fasteners 130a-130d are turned into respective openings 120a-120d, the fasteners contact the upper surface 125' of the second discontinuous ring, thereby forcing the second discontinuous ring 110' away from the first discontinuous ring 105'.

Figure 5:
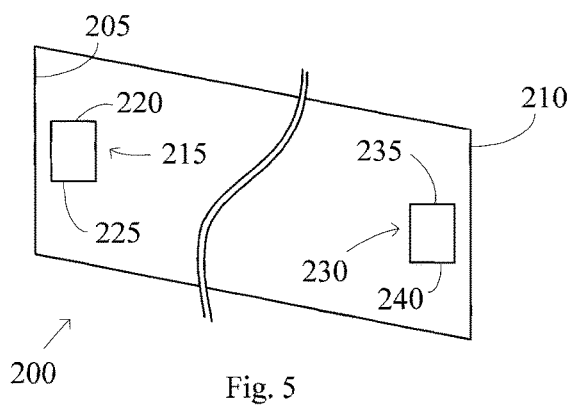
FIGS. 5 and 6 are side views of elongated strut configurations that may be used in a geodesic framing system, in accordance with embodiments of the invention.

FIG. 5 is a side view of an elongated strut 200 configuration, that may be used in a geodesic framing system, in accordance with an embodiment of the invention. As shown in FIG. 5, the elongated strut includes a first end 205 and a second end 210. Proximate the first end 205 is a first elongated strut opening shown at 215, that includes upper and lower edges 220, 225, respectively. Shown as a further embodiment, the elongated strut 200 may further include a second opening shown at 230 proximate the second end 210, including a second opening upper and lower edges 235, 240, respectively.

The first elongated strut opening 215 may be similar to and greater in size as the cross section of the discontinuous ring pair, for example, the cross section 140' shown at FIG. 4A. Having the opening greater in size, allows the discontinuous ring pair to be inserted through the opening 215 in a similar fashion as described below with respect to FIG. 7. The elongated strut second opening 230 may be sized in a similar fashion as the first opening 215.

Figure 6:
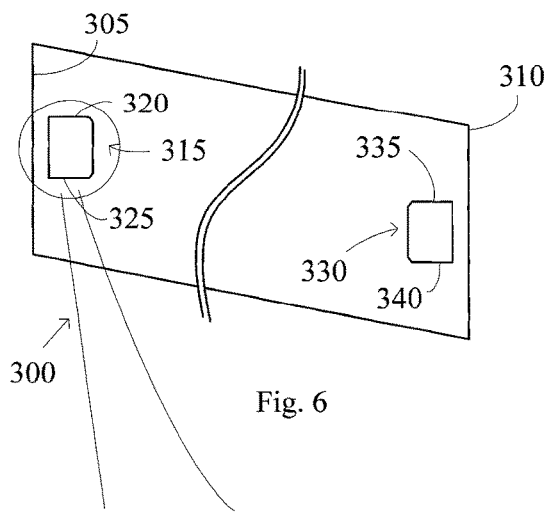

FIG. 6 is a side view of an elongated strut 300, with a magnified portion of the opening, that may be used in a geodesic framing system, in accordance with an embodiment of the invention. The elongated strut 300 of FIG. 6 is similar to the elongated strut 200 of FIG. 5, except for the shape of the elongated strut opening. Thus, the elongated strut 300 may include a first end 305, and a second end 310, as well as an opening 315 proximate the first end 305. The opening 315 may further include upper and lower edges 320, 325 respectively. As a further embodiment, the elongated strut 300 may further include a second opening shown at 330 proximate the second end 310, and including a second opening upper and lower edges 335, 340 respectively.

As shown in FIG. 6, the openings differ from the openings of the elongated strut 200 of FIG. 5, in that the openings 315 and 330 are in the shape of a block letter 'D'. As shown in the blown-up section of FIG. 6, the upper and lower edges 320 and 325 of the opening 315 have a substantially parallel portion shown at 350, proximate to the first end 305, and a tapered-in portion shown at 360 away from the first end 305. The second opening shown at 330 may also include edges 335 and 340 that have a substantially parallel portion and tapered-in portion.

It will be appreciated that the openings 215, 230 of the elongated strut 200 of FIG. 5, and the block 'D' openings 315 and 330 of the elongated strut 300 of FIG. 6 are both capable of being coupled with the geodesic dome hub connectors discussed above. In the embodiment of FIG. 6, the block 'D' openings may provide some additional clearance for coupling the elongated struts with the geodesic structure hub connectors. The coupling of the geodesic dome hub connector, for example, geodesic dome hub connector 100' with one or more elongated struts, for example, the elongated strut configuration 300, will be discussed with respect to FIGS. 7-9, in accordance with an embodiment of the invention.

Figure 7:
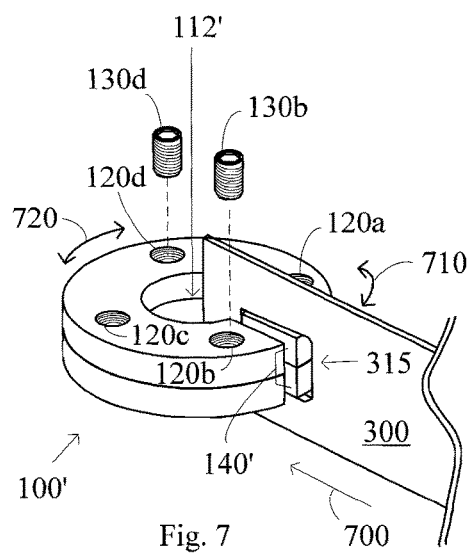
FIG. 7 illustrates a partial-exploded perspective view of the coupling of an elongated strut to the hub connector, in accordance with an embodiment of the invention.

FIG. 7 illustrates a partial-exploded perspective view of the coupling of an elongated strut to the hub connector, in accordance of an embodiment of the invention. Elements of FIG. 7 having reference numbers already used, are the same and will not be discussed in detail. The view of FIG. 7 shows only two fasteners, 130b and 130d. It will be appreciated that more or less fasteners may be used.

As shown in FIG. 7, the elongated strut 300 first end 305 may be inserted into the discontinuity of the discontinuous ring pair, in the direction 700, such that the opening 315 is substantially aligned with the cross section 140' of the discontinuous ring pair formed by discontinuous rings 105' and 110'. The elongated strut 300 may be rotated onto the discontinuous ring pair, in the direction 710. In addition, or in the alternative, the discontinuous ring pair may be rotated in the direction 720 to capture the elongated strut 300.

After capturing the desired number of elongated struts, fasteners, for example, fasteners 130*b* and 130*d*, may be inserted into openings, for example, openings 120*b*, 120*d*, to secure the struts within the geodesic dome connector and helping to prevent the hub connector from becoming disengaged from the elongated strut. In some embodiments, i.e., using the elongated strut 300 of FIG. 6, the alignment/seating of elongated struts may be improved. FIGS. 8A-8D will illustrate the securing and seating process, showing two elongated struts for clarity purposes, spaced 180 degrees apart along the geodesic dome connector 100' of FIG. 3.

Figure 8A:
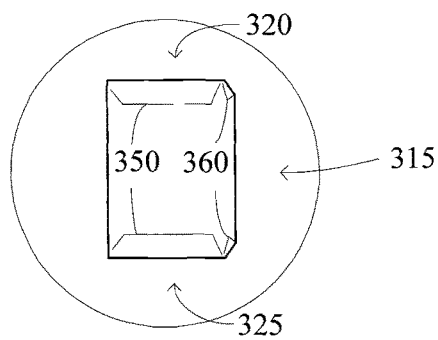
FIGS. 8A-8D show perspective and sectional views of the geodesic dome hub connector being secured and aligned with elongated struts, in accordance with an embodiment of the invention.
Figure 8A:
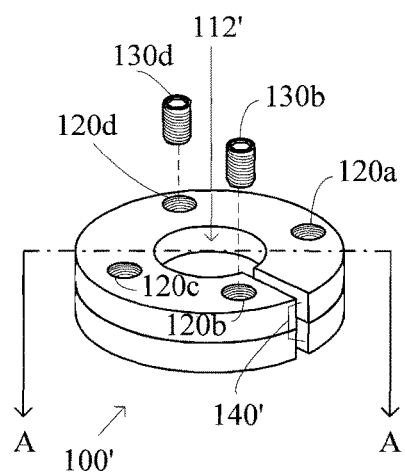
Figure 8B:
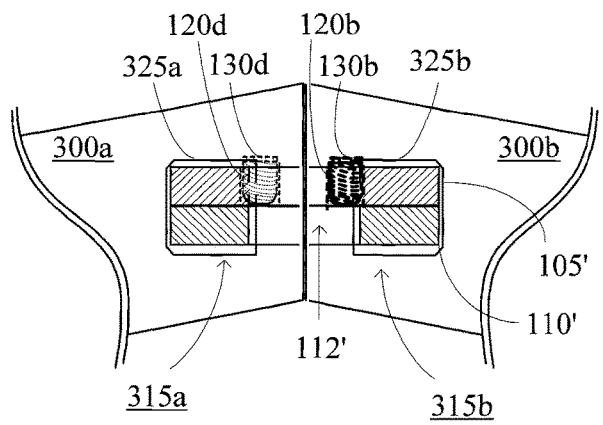
Figure 8C:
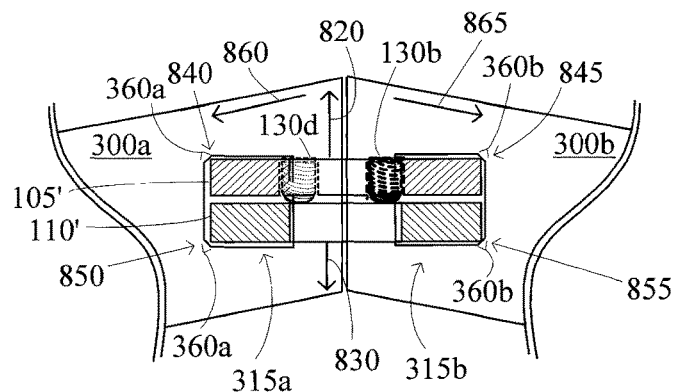
Figure 8D:
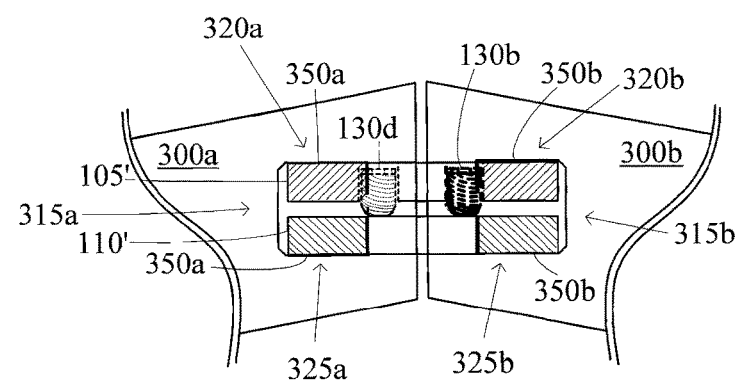

FIG. 8A is a partially-exploded perspective view of the geodesic dome connector 100' of FIG. 3, used to illustrate securing and aligning elongated struts, in accordance with an embodiment of the invention. FIGS. 8B-8D are front sectional views along line A-A of the geodesic dome connector 100' of FIG. 8A, demonstrating how the fastener insertion may secure and align elongated struts, in accordance with an embodiment of the invention. Elements of FIGS. 8A-8D having reference numbers previously used, are the same, and will not be discussed in detail.

FIG. 8A shows the geodesic dome connector 100' of FIG. 3, where the first and second discontinuous rings 105' and 110' are shown placed adjacent one another, with the lower face of the first discontinuous ring 105' adjacent the upper face 125' of the second discontinuous ring 110'. Two fasteners 130*b*, 130*d* are shown. More or less fasteners may be used. As shown, the discontinuities exposes the discontinuous ring pair cross section, shown at 140'.

FIGS. 8B-8D illustrate a front sectional view of the geodesic dome connector 100', having two elongated struts coupled therewith. Specifically, the elongated strut style 300 of FIG. 6 is shown. Thus, elements of FIG. 8B having reference numbers used in FIG. 6, but having an 'a' or 'b' designation, are referring to like elements of the elongated strut 300 of FIG. 6, for the 300*a* and 300*b* elongated struts. It should be noted that in a sectional view, the opening 120*b* and fastener 130*b* would normally not be shown, as those components reside forward of the section A-A shown in FIG. 8A. As such, they have been included in bold in FIGS. 8B-8D, to demonstrate the separation of the first and second discontinuous rings 105' and 110' as the fasteners are inserted.

Referring to FIG. 8B, two elongated struts are shown, elongated Struts 300*a* and 300*b*, spaced about 180 degrees apart along the geodesic dome hub connector 100'. Other placement or spacing is possible. Two fasteners, 130*b* and 130*d*, are shown partially inserted into openings 120*b* and 120*d*, respectively. However, the fasteners shown in FIG. 8B are not yet inserted sufficiently to cause separation of the first and second discontinuous rings 105', 110'.

As shown in FIG. 8C, the fasteners 130*b*, 130*d* are inserted to a greater extent into the respective openings 120*b*, 120*d*, thereby causing the first and second discontinuous rings 105', 110' to become forced apart, in the direction shown at 820 and 830. This may cause the first discontinuous ring 105' to contact the elongated struts 300*a* and 300*b* at inwardly tapered portions 360*a*, 360*b*, for example, as shown at 840 and 845. Similarly, separation of the first discontinuous rings 105' from 110' may cause the second discontinuous ring 110' to contact elongated struts 300*a* and 300*b* at inwardly tapered portions 360*a*, 360*b*, for example, as shown at 850 and 855. As the separation of the first and second discontinuous rings 105' and 110' continues as the fasteners 130*b*, 130*d* are inserted, the elongated struts 300*a* and 300*b* are forced in the directions 860 and 865 respectively.

As shown in FIG. 8D, insertion of the fasteners 130*b*, 130*d* may cause the upper face of the first discontinuous ring 105' to contact the upper edges 320*a*, 320*b* of elongated struts 300*a*, 300*b*, and may cause the lower face of the second discontinuous ring 110' to contact the lower edges 325*a*, 325*b* of elongated struts 300*a*, 300*b*. In this way, the discontinuous rings 105', 110' may become seated within the substantially parallel portions 350*a*, 350*b* of the elongated struts 300*a*, 300*b*. Such seating may allow the elongated struts to become more accurately aligned in a desired fashion within the geodesic frame system. Such seating may also help to prevent the discontinuous rings of the geodesic dome hub connector from becoming uncoupled from the elongated struts, for example, by preventing the discontinuous rings from rotating or shifting in a fashion to allow an elongated strut to becoming aligned with a discontinuity of a discontinuous ring disengaging therefrom.

The exemplary embodiments of FIGS. 7 and 8A-8D are shown with elongated struts of the configuration shown in FIG. 6. It will be appreciated that elongated struts having the configuration of FIG. 5 could also be rotated onto a discontinuous ring pair in a similar fashion as described with respect to FIG. 7. It will be further be appreciated that the insertion of the fasteners, for example, fasteners 130*b* and 130*d* may cause separation of the discontinuous rings 105', 110', thereby causing the discontinuous rings to contact upper and lower edges of the elongated strut opening, for example, the upper and lower edges 220, 225 discussed above with respect to the elongated strut of FIG. 5. In this way, the discontinuous rings 105' and 110' may be secured within openings 215, 230, thereby reducing the possibility of the hub connector becoming disengaged from the elongated struts coupled thereto, in a similar fashion as described above with respect to FIGS. 8A-8D.

Figure 9:
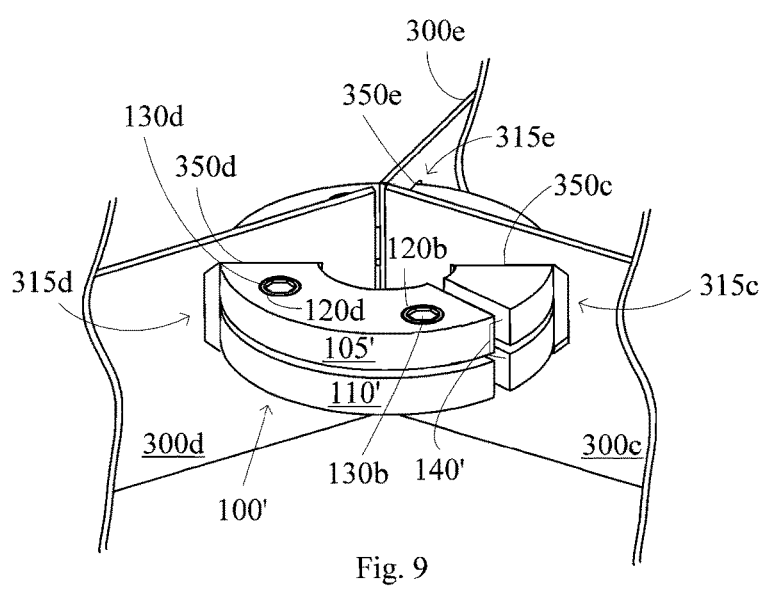
FIG. 9 is a perspective view of a geodesic dome hub connector coupled with three elongated struts, in accordance with an embodiment of the invention.

FIG. 9 is a perspective view of a geodesic dome hub connector coupled with three elongated struts, in accordance with an embodiment of the invention. Elements of FIG. 9 have reference numbers previously used, are the same and will not be discussed in detail. The elongated struts of FIG. 9 are shown having the configuration of the elongated strut 300 of FIG. 6. Accordingly, elements of FIG. 9 having reference numbers used in FIGS. 6, 7 and 8A-8D but with a 'c', 'd' or 'e' designation, are similar and will not be discussed in detail.

As shown in FIG. 9, discontinuous rings, for example, discontinuous rings 105' and 110' may be coupled to three elongated struts 300*c*, 300*d* and 300*e*, in a similar fashion as described above with respect to FIGS. 7 and 8A-8D. Thus, the upper face of the discontinuous ring 105' and lower face of discontinuous ring 110' may be seated within the elongated strut openings in the substantially parallel portions 350*c*, 350*d* and 350*e*. Such seating may allow the elongated struts, here elongated struts 300*c*, 300*d* and 300*e*, to be more properly aligned with respect to one another. In addition, the hub connector 100' may be more securely held within openings of the elongated struts 300*c*-300*e* through insertion of the fasteners 130*b*, 130*d*, thereby reducing the possibility that the hub connector 100' will become disengaged from the elongated struts 300*c*-300*e*. The combination of a geodesic hub connector 100' along with a plurality of elongated struts may thus be coupled to form a hub of a geodesic framing system. Such a geodesic framing system may include a plurality of such hubs, limited by only the desired dimensions and configuration of the geodesic structure being formed.

As shown in FIG. 9, a configuration including two fasteners and three elongated struts is shown. It will be appreciated that more or less fasteners may be utilized in securing the discontinuous rings in the elongated strut openings. It will be realized that more or less elongated struts may be coupled by the geodesic dome hub connector 100'. It will be additionally realized that a geodesic dome framing system may instead utilize elongated struts having the configuration of the elongated strut 200 of FIG. 5, or some combination of the elongated struts 200 and 300 of FIGS. 5 and 6, respectively. Further, though the embodiments of FIGS. 7, 8A-8D and 9 describe elongated struts having an opening only at the first end, it will be appreciated that elongated struts having openings at both ends may be utilized. Thus, additional geodesic dome hub connectors like 100' may be used with additional elongated struts, thereby forming additional hubs within a geodesic framing system.

In addition, it will be appreciated that although a block 'D' configuration with the substantially parallel portion adjacent the elongated strut end is described above, that the block 'D' configuration opening may instead be oriented with the tapered-in portion being adjacent the strut end. In this case, as the struts are seated by insertion of the fasteners, the struts would be forced in a direction opposite directions 860, 865 shown in FIG. 8C, and thus the seating process would draw the struts toward one another. Accordingly, the strut opening placement on the strut may be shifted slightly closer to the strut end, to allow the ends of the elongated struts being coupled within the hub connector from binding or contacting one another after being seated in the substantially parallel portions of the elongated strut opening. Such a design consideration may be further accounted for when determining the overall length of an elongated strut within the geodesic structure, if desired.

Figure 10A:
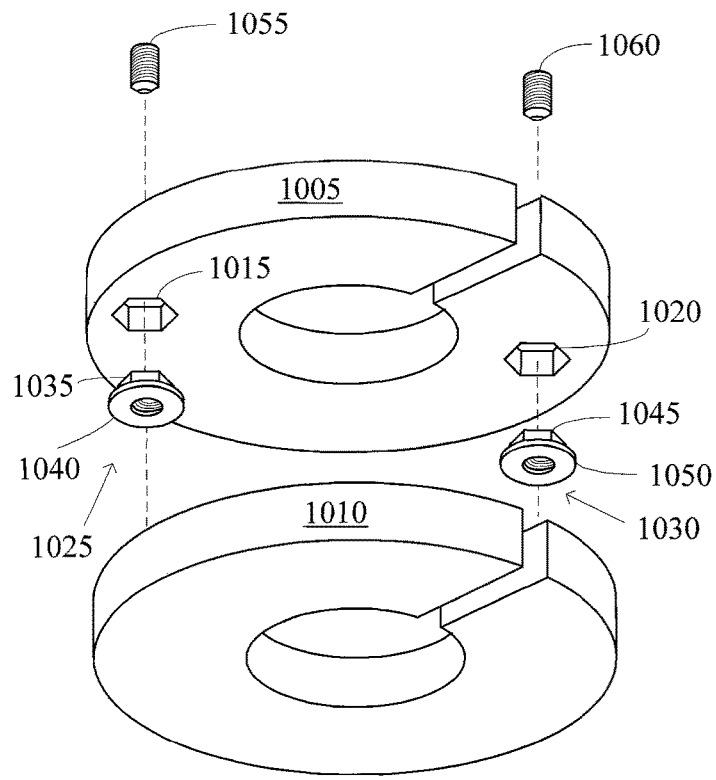
FIGS. 10A-10B are an exploded perspective view from the underside and front view of a geodesic dome connector, for a geodesic framing system, in accordance with an embodiment of the invention.
Figure 10B:
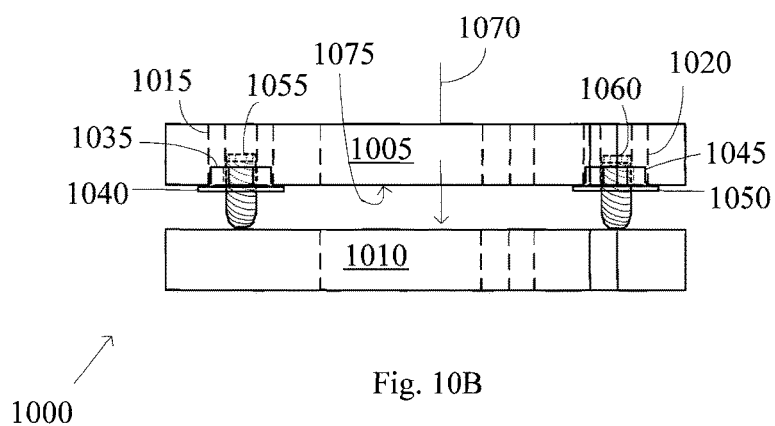

FIG. 10A is an exploded perspective view of a geodesic dome connector from the underside, for a geodesic framing system, in accordance with another embodiment of the invention. FIG. 10B is a front view of the geodesic dome connector of FIG. 10A, illustrating the separation of the first and second discontinuous rings, in accordance with an embodiment of the invention.

As shown in FIG. 10A, a geodesic dome hub connector 1000 includes first and second discontinuous rings 1005, 1010, respectively. The first discontinuous ring 1005 includes first and second openings, 1015 and 1020, that extend through the first discontinuous ring 1005. The openings need not be threaded. Further shown are first and second separator pieces, here shown as flanged nuts 1025 and 1030. The flanged nuts 1025, 1030 include respective nut portions 1035, 1045, and respective flange portions 1040, 1050. The nut portions 1035, 1040 are sized to fit within the openings 1015, 1020, while the flange portions 1040, 1050 are sized to be larger than (i.e., have a face dimension, a dimension of its face, greater than) the openings 1015, 1020, preventing the flanged nuts from being completely drawn into the openings. Further shown in FIG. 10A are fasteners 1055 and 1060. The fasteners 1055 and 1060 may be threaded, with threading compatible with the threads of the flanged nuts 1025, 1030 respectively.

As shown in FIG. 10B, the flanged nuts 1035, 1040 may be inserted within the respective openings 1015, 1020, where the flange portions 1040, 1050 prevent the flanged nuts from completely entering the openings. The second discontinuous ring 1010 may be placed adjacent the first discontinuous ring 1005, such that insertion (i.e., here, turning) the fasteners 1055, 1060 into respective flanged nuts 1025, 1030, causes the fasteners to contact the upper face 1070 of the second discontinuous ring 1010, while the flange portions 1040 and 1050 contact the lower face 1075 of the first discontinuous ring 1005. This causes the first discontinuous ring 1005 to be forced away from the second discontinuous ring 1010.

Figure 11:
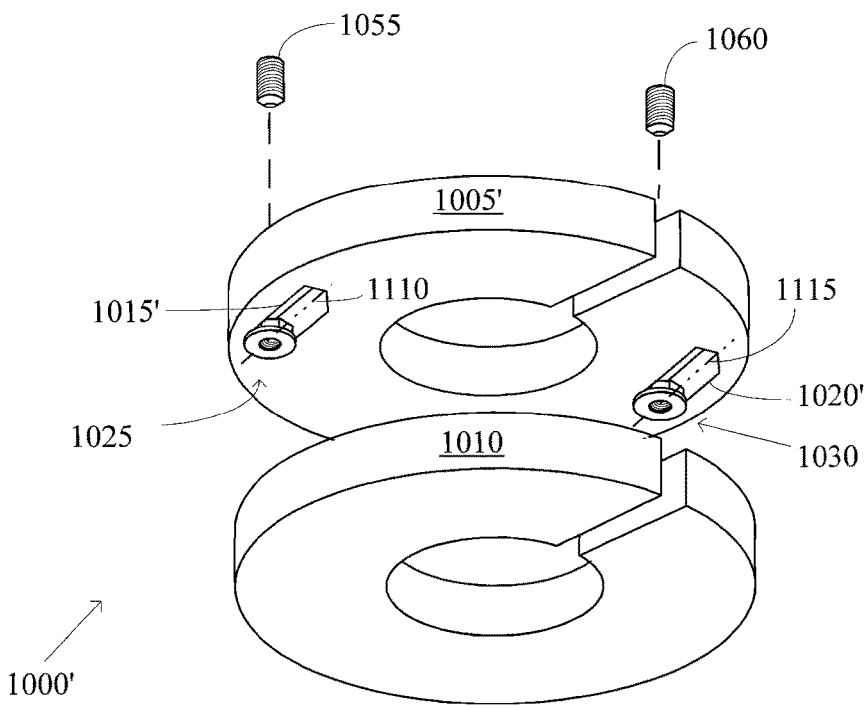
FIG. 11 is an exploded perspective view of a geodesic dome connector from the underside, having an elongated opening, in accordance with an embodiment of the invention.
Figure 12:
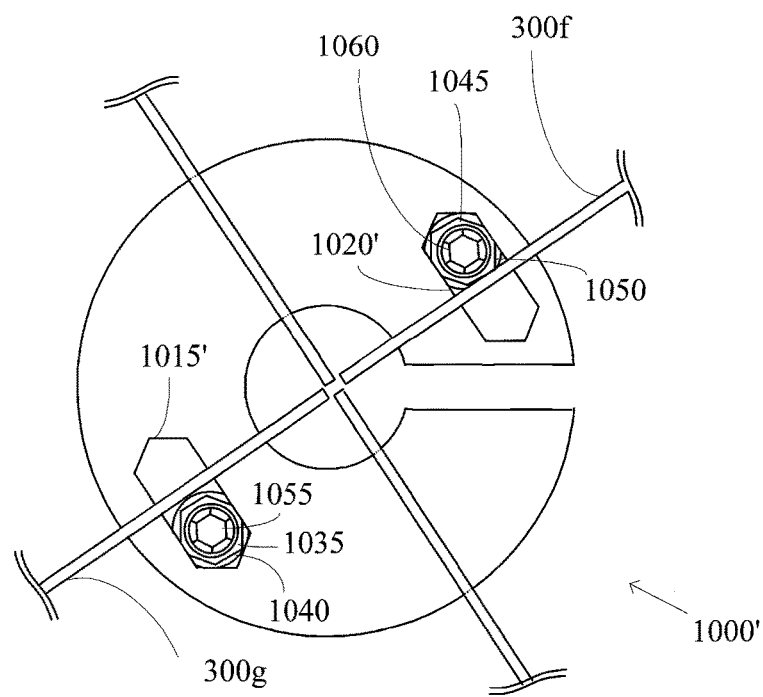
FIG. 12 is a top view of a geodesic dome connector illustrating use of an elongated opening to avoid a strut obstruction, in accordance with an embodiment of the invention.

It will be appreciated that the geodesic dome hub connector 1000 shown in FIGS. 10A-10B may thus be used in a similar fashion with elongated struts, i.e., elongated struts 200 and/or 300 of FIGS. 5 and 6, as part of a geodesic frame connector system, in a similar fashion as described above with respect to FIGS. 7, 8A-8D and 9. Instead of using threaded openings 120b and 120d with threaded fasteners to achieve separation of the first and second discontinuous rings 105' and 110' of FIGS. 7 and 8A-8D, the geodesic dome hub connector 1000 of FIG. 10 may utilize the threaded flanged nuts 1025, 1030 with threaded fasteners to achieve separation of the discontinuous rings 1005, 1010, where the first discontinuous ring openings 1015 and 1020 lack threading. Further, it will be appreciated that though the openings 1015 and 1020 are shown with a hexagonal cross section, the openings may have other cross sections, for example a round cross section, or any cross section that substantially matches the portion of the separator piece that is seated therein. FIGS. 11 and 12 illustrate embodiments where an elongated opening may prevent strut obstructions, in accordance with embodiments of the invention.

FIG. 11 is an exploded perspective view of a geodesic dome connector from the underside, for a geodesic framing system, in accordance with another embodiment of the invention. Elements of FIG. 11 having reference numbers that are the same as in FIG. 10, are the same and will not be discussed in detail.

As shown in FIG. 11, a geodesic dome hub connector 1000' differs from the geodesic dome hub connector 1000 of FIG. 10 in that the openings are elongated. Thus, the openings 1015' and 1020' are shown with elongated openings. Specifically, the openings are shown as elongated hexagonal-shaped openings, allowing the nut portions of the respective flanged nuts 1025, 1030 to fit within the openings 1015', 1020', while the flanged portions prevent the flanged nuts from completely entering the openings 1015', 1020'. As the openings 1015', 1020' are elongated along major axes of the openings 1015', 1020', depicted at 1110, 1115 respectively, the flanged nuts 1025, 1030 may be positioned to a desire location along the respective opening. As shown in FIG. 11, the flanged nuts 1025, 1030 are shown with the nut portions recessed within the respective openings 1015', 1020', with the flange portions preventing the flanged nuts from completely entering the openings.

FIG. 12 is a top view of the geodesic dome hub connector 1000' of FIG. 11, illustrating the use of elongated openings to avoid strut obstructions, in accordance with an embodiment of the invention. Elements of FIG. 12 having reference numbers that are the same as in FIGS. 10 and 11, are the same and will not be discussed in detail. Further, though FIG. 12 shows four elongated struts, for clarity, only two elongated struts are referenced that may be the same configuration of the elongated strut 300 of FIG. 6. Such elongated struts are designated as elongated struts 300f and 300g.

As shown in FIG. 12, the elongated struts 300f and 300g obstruct a portion of the openings 1020' and 1015' respectively. As the openings 1015' and 1020' are elongated openings, the flanged nuts (obstructed by the first discontinuous ring 1005 but partially shown by the nut portions 1035, 1045 and flange portions 1040, 1050) may be positioned to a desired location along the respective elongated opening to avoid the obstructing struts. After positing the flanged nuts to the desired location, the fasteners (i.e., fasteners 1055, 1060) may then be inserted to separate the first discontinuous ring 1005 from the second discontinuous ring 1010 (hidden in FIG. 12), in a fashion similar to as described with respect to FIGS. 7, 8A-8D and 9 above, thereby securing (and aligning in this embodiment) the elongated struts with the geodesic dome hub connector 1000'.

The elongated openings may be approximately 1 inch long, having a width greater than the cross section of the nut portion of the flanged nut, for example ½ inch wide. Other dimensions may be used. Though the elongated openings are shown in FIGS. 11 and 12 as having an elongated hexagonal cross section, it will be appreciated that the cross section may be shaped differently, for example, as an oval-shaped cross section.

Figure 13A:
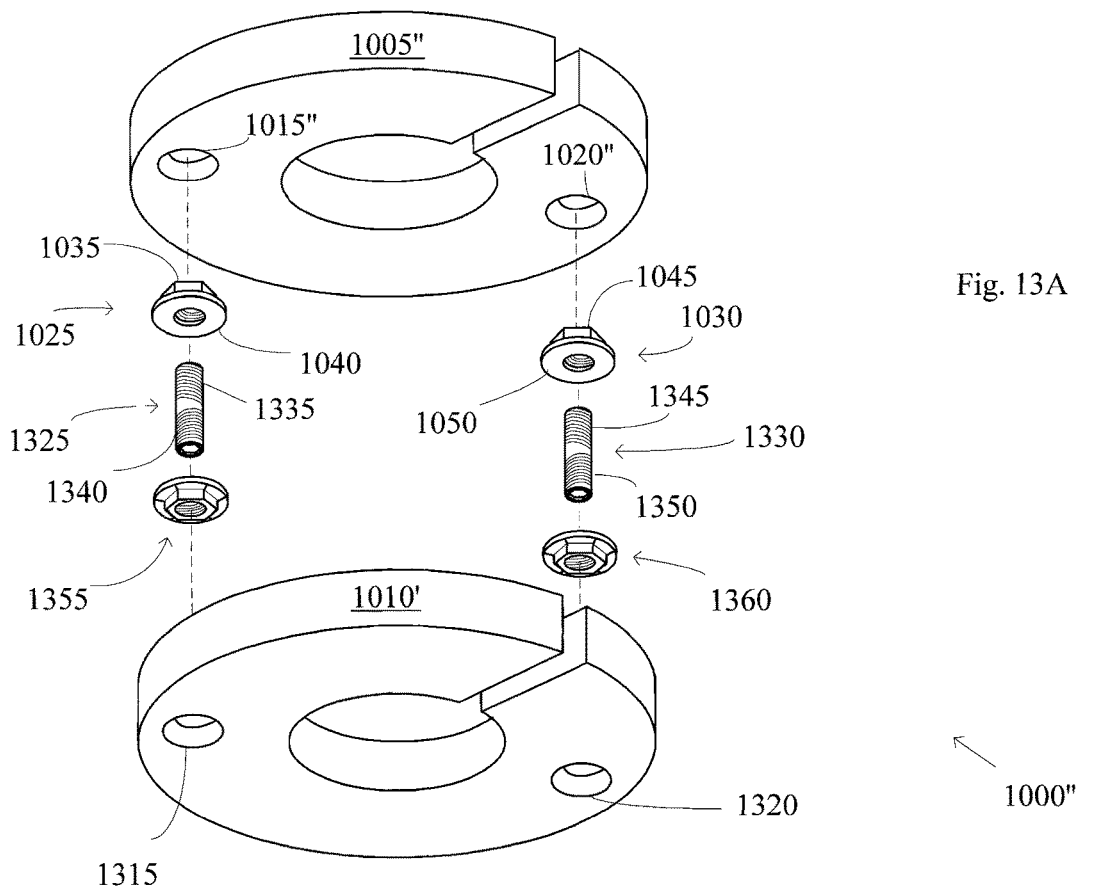
FIGS. 13A-13B are an exploded perspective view from the underside and front view of a geodesic dome connector, in accordance with an embodiment of the invention.
Figure 13B:
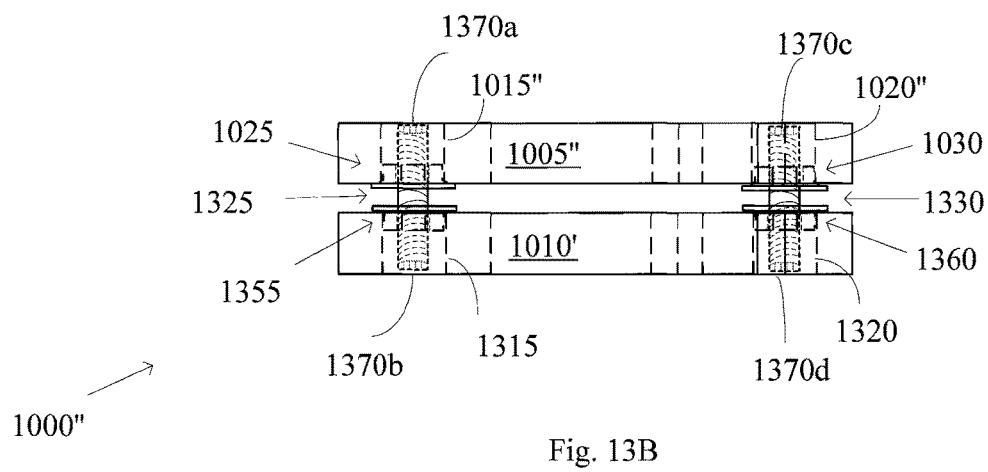

FIG. 13A is an exploded perspective view of a geodesic dome connector from the underside, for a geodesic framing system, in accordance with an embodiment of the invention. FIG. 13B is a front view of the geodesic dome connector of FIG. 13A, illustrating the separation of the first and second discontinuous rings, in accordance with an embodiment of the invention. Elements of FIG. 13 having reference numbers already used, are the same and will not be discussed in detail.

As shown in FIG. 13A, a geodesic dome hub connector 1000" differs from the geodesic dome hub connector 1000 of FIG. 10, in that the openings 1015" and 1020" of the first discontinuous ring 1005" have a round cross section, and that the second discontinuous ring 1010' includes first and second openings, 1315 and 1320, having a round cross section, through the second discontinuous ring. The openings 1015", 1020", 1325, 1330 are sized large enough to allow the nut portion of the respective flange nuts to be seated therein, while being smaller than the flange portion of the respective flange nuts. First and second fasteners 1325 and 1330, respectively, are shown with both right-handed and left handed threaded portions. For example, first and second fasteners 1325, 1330 may include respective right-handed threading portions 1335, 1345. First and second fasteners 1325, 1330 may further include respective left-handed threading portions 1340, 1350. Further shown are flanged nuts 1355 and 1360, that are sized in a way to allow the nut portions (not specifically identified in FIG. 13) to fit within their respective opening 1315, 1320, while the flanged portions (not specifically identified in FIG. 13) are larger than the opening cross section, thereby preventing the flanged nuts 1355, 1360 from completely entering respective openings 1315 and 1320. The flanged nuts 1025, 1030 may have a compatible right-handed threading with the respective right-handed threaded portions 1335, 1345. Similarly, the flanged nuts 1355, 1360 may have a compatible left-handing threading as respective left handed portions 1340, 1350.

As shown in FIG. 13B, flange nuts 1025 and 1355 may be rotated onto fastener 1325, and flange nuts 1030 and 1360 may be rotated onto fastener 1330. The fastener 1325 with flange nuts 1025, 1355 and fastener 1330 with flange nuts 1030, 1360, may then be sandwiched between the first discontinuous rings 1005", 1010', by insertion into openings 1015", 1315 and 1020", 1320. The nut portions of the flanged nuts may be recessed within the openings 1015", 1315 and 1020", as shown in FIG. 13B. Each end of the fastener 1325, and 1330 may be configured at each fastener end (i.e., ends 1370a-1370d) to receive a driver or bit, for example, a hex bit in the case of an allen screw, allowing for turning of the fastener through a respective discontinuous ring opening. In the alternative, only one end of each fastener may be configured for receiving a driver bit.

Due to the left and right-head thread portions of fastener 1325 and with correspondingly threaded flanged nuts 1025 and 1355, turning the fastener will cause the flanged nuts to separate from one another, causing the flanged portion of each flanged nut to push against a respective face of the first and second discontinuous rings 1005", 1010'. For example, the flanges of the flange nuts 1025, 1030 will push against the lower face of the first discontinuous ring 1005", and the flanges of the flanged nuts 1355, 1360 will push against the upper face of the second discontinuous ring 1010', causing the first discontinuous ring to separate from the second discontinuous ring. Such separation will cause any coupled elongated struts to be secured, and in some embodiments, aligned, in a similar fashion as the geometric dome hub connector 100' securing and/or aligning elongated struts 300a, 300b as described above with respect to FIGS. 7, 8A-8B and 9.

It will be appreciated that though the openings 1015", 1020", 1315 and 1320 are shown as having a round cross section, the openings may instead have a cross section that matches the cross section of the separator piece portion seated therein, here a flanged nut. For example, where the nut portion of the flanged nut has a hexagonal cross-section, the openings 1015", 1020" may likewise have a hexagonal cross section, being sized large enough to accept the nut portions 1035, 1040 of the respective flanged nuts 1025, 1030, while being smaller than the face of the respective flanged portions 1040, 1050.

Figure 14:
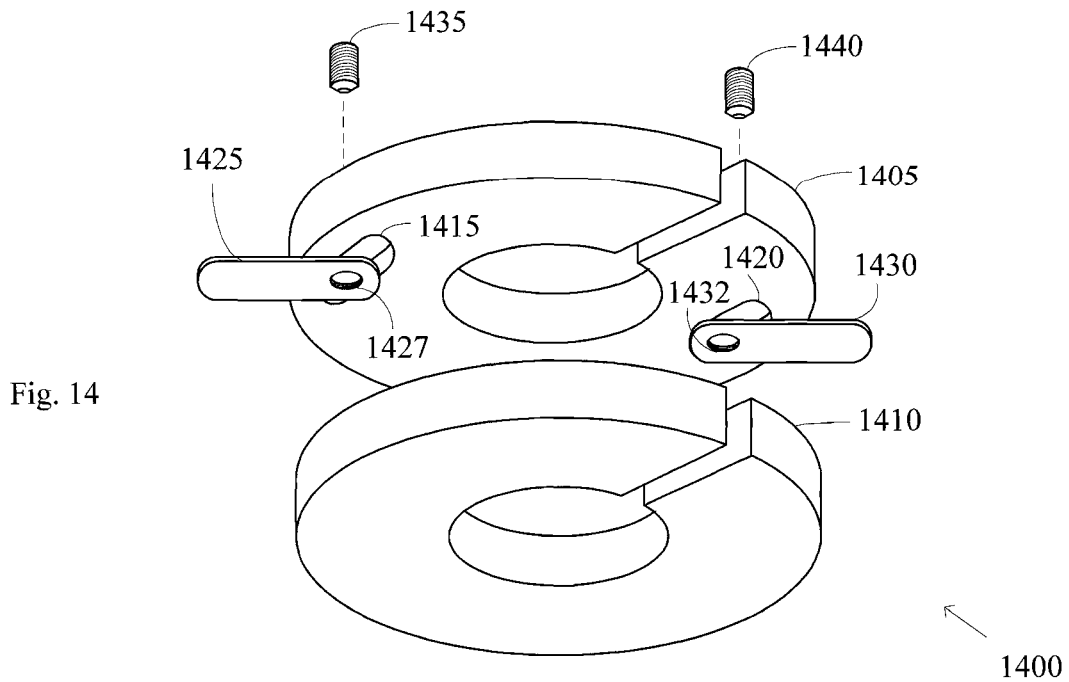
FIG. 14 illustrates an exploded-perspective view of a geodesic dome hub connector utilizing separator pieces extending beyond a perimeter of the hub connector, in accordance with an embodiment of the invention.

FIG. 14 illustrates an exploded-perspective view of a geodesic dome hub connector showing separator pieces extending beyond a perimeter of the hub connector, in accordance with an embodiment of the invention.

As shown in FIG. 14, a geodesic dome hub connector 1400 may include a first discontinuous ring 1405 and a second discontinuous ring 1410, the first discontinuous ring including openings, for example, elongated openings 1415 and 1420. A separator piece 1425 may be provided, and includes a separator piece opening 1427. A separator piece 1430 may be provided, and includes a separator opening 1432. As shown in FIG. 14, the separator pieces 1425, 1430 may each have a face dimension greater than a respective ring opening (i.e., having a dimension of the separator piece face that is greater than the diameter of its respective ring opening). The separator pieces 1425, 1430 may extend beyond an outer perimeter of the first and second discontinuous rings 1405, 1410. Additionally, fasteners 1435 and 1440 are also included. The fasteners 1435 and 1440 may be threaded, where the respective separator openings 1427 and 1432 are compatibly threaded with the threading of the respective fasteners 1435, 1440.

When the separators 1425, 1430 are sandwiched between the first and second discontinuous rings 1405, 1410, and positioned along their respective elongated opening 1415, 1420 to a desired location, insertion of the fasteners (i.e., here, by turning the fasteners) will cause the fasteners to contact the upper face of the second discontinuous ring 1410, which will cause the separator pieces to push against the lower face of the first discontinuous ring 1405. Such force will cause the first and second discontinuous rings 1405 and 1410 to separate from one another. In a similar fashion as described above with respect to flange nuts 1025, 1030 as described at FIG. 10B, such separation may secure any elongated struts coupled with the geodesic dome hub connector 1400, and in some embodiments (i.e., as in the use of an elongated strut 300 of FIG. 6), to be substantially aligned. Such securing and alignment of elongated struts may occur, for example, in a fashion similar as discussed above with respect to FIGS. 7, 8A-8D and 9.

Figure 15:
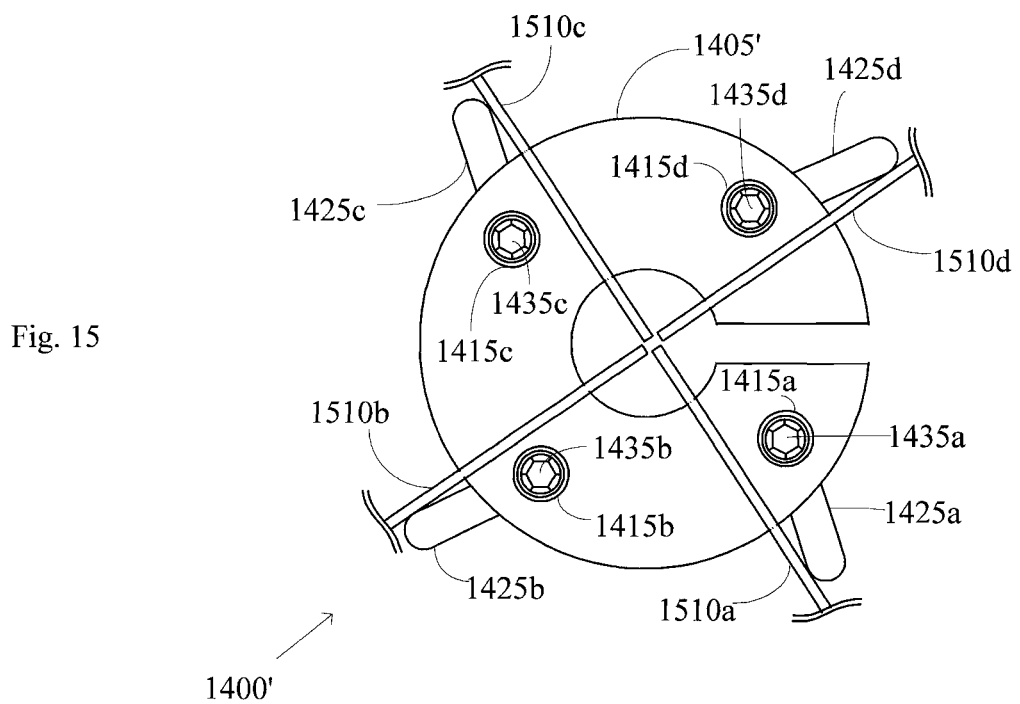
FIG. 15 illustrates a top view of a geodesic dome hub connector showing separator pieces aiding in securing the hub connector, in accordance with an embodiment of the invention.

FIG. 15 is a top view of the geometric dome hub connector coupled with four elongated struts, in accordance with an embodiment of the invention. Elements of FIG. 14 having reference numbers previously used, are the same and will not be discussed in detail.

Referring to FIG. 15, a geodesic dome hub connector 1400' is similar to the geodesic dome hub connector 1400 of FIG. 14, except four openings, separator pieces and fasteners are provided. Thus, the first discontinuous ring 1405' differs from the discontinuous ring 1405 in that four openings 1415a-1415d are shown, with corresponding fasteners shown as 1435a-1435d. Separator pieces 1425a-1425d are shown, and may have the same configuration as the separator pieces 1425 and 1430 of FIG. 14. Four elongated struts, for example similar to the elongated strut 300 of FIG. 6 described above, are shown as 1510a-1510d.

In a similar fashion as described with respect to FIG. 14, as the fasteners 1435a-1435d are inserted, the fasteners contact the upper face of the second discontinuous ring (hidden in FIG. 15), causing the respective separator piece to push against the lower face of the first discontinuous ring 1405', thereby causing the discontinuous rings to separate from one another. As further shown in FIG. 15, as the separator pieces extend beyond an outside perimeter of the first discontinuous ring 1405' and second discontinuous ring (not shown), the separator piece may be seated against the side of a respective elongated strut to provide additional stability for the geodesic dome structure, and to help prevent the discontinuous rings from becoming disengaged from (i.e., rotating out of) the struts. For example, the separator pieces 1425a-1425d may seat, or lock, against respective elongated struts 1510a-1510d as shown in FIG. 15.

Figure 16:
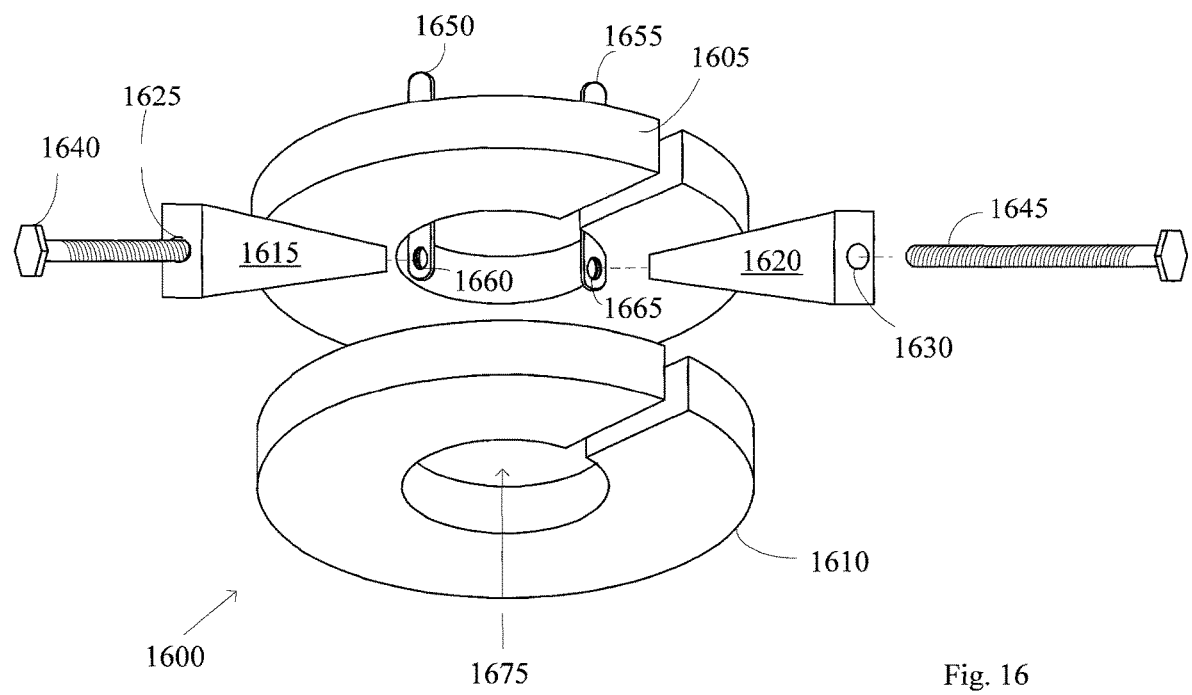
FIG. 16 is a partial-exploded view of a geodesic dome hub connector, utilizing wedge and anchor pieces, in accordance with an embodiment of the invention.

FIG. 16 is a partial-exploded view of a geodesic dome hub connector in accordance with an embodiment of the invention. As shown in FIG. 16, a geodesic dome hub connector 1600 may include first and second discontinuous rings 1605 and 1610, respectively. Wedges 1615 and 1620 are provided, having respective openings 1625 and 1630 that extend through each wedge along a major axis of the wedge. Fasteners 1640 and 1645 are provided, having a head with a cross section greater that its respective wedge opening 1625, 1630, thereby preventing the fasteners 1640, 1645 from completely entering respective wedge openings 1625, 1630. As shown, the fasteners may be threaded. Further shown are wedge anchors 1650 and 1655. Wedge anchors 1650, 1655 include respective openings 1660, 1665, that are compatibly threaded for receiving respective fasteners 1640, 1645. The discontinuous rings 1605 and 1610 define a discontinuous ring pair, where an inner perimeter of the discontinuous rings 1605, 1610 define an inner discontinuous ring pair opening, shown at 1675.

The wedges 1615, 1620 may be sandwiched between the first and second discontinuous rings 1605, 1610, with the wedge anchors being inserted in the discontinuous ring pair opening 1675 such that the openings 1660 and 1665 are substantially aligned with the respective openings 1625 and 1630 of the respective wedge portions 1615, 1620. Inserting the fasteners, here by turning the fasteners 1640, 1645, into the wedge openings 1660, 1665, draws the wedge portions 1615, 1620 toward the respective wedge anchor 1650, 1655, thereby causing the first discontinuous ring 1605 to separate from the second discontinuous ring 1610.

Thus, the geodesic dome hub connector 1600 may be used to secure and/or align elongated struts in a fashion similar to the geodesic dome hub connector 100' as described above with respect to FIGS. 7, 8A-8B and 9.

Figure 17:
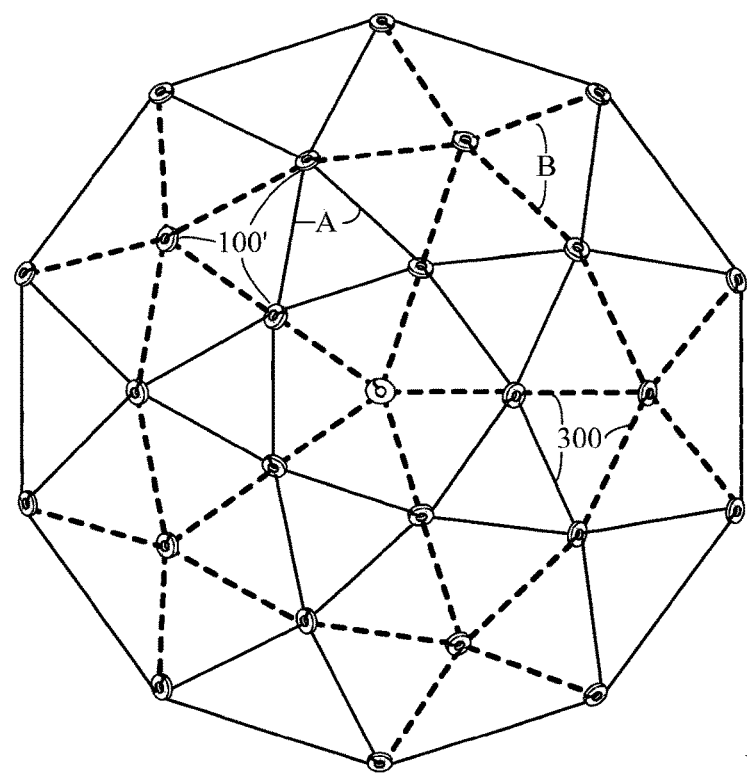
FIG. 17 is a top view of a geodesic frame connector system utilizing geodesic dome hub connectors and elongated struts described herein, in accordance with an embodiment of the invention.
Figure 18A:
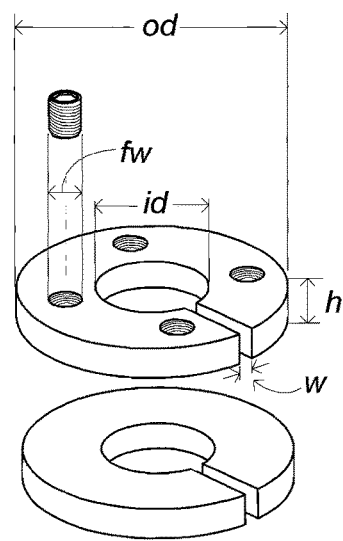
FIG. 18A is an exploded perspective view used to show dimensions of a geodesic dome hub connector for the geodesic structure of FIG. 17, in accordance with an embodiment of the invention.
Figure 18B:
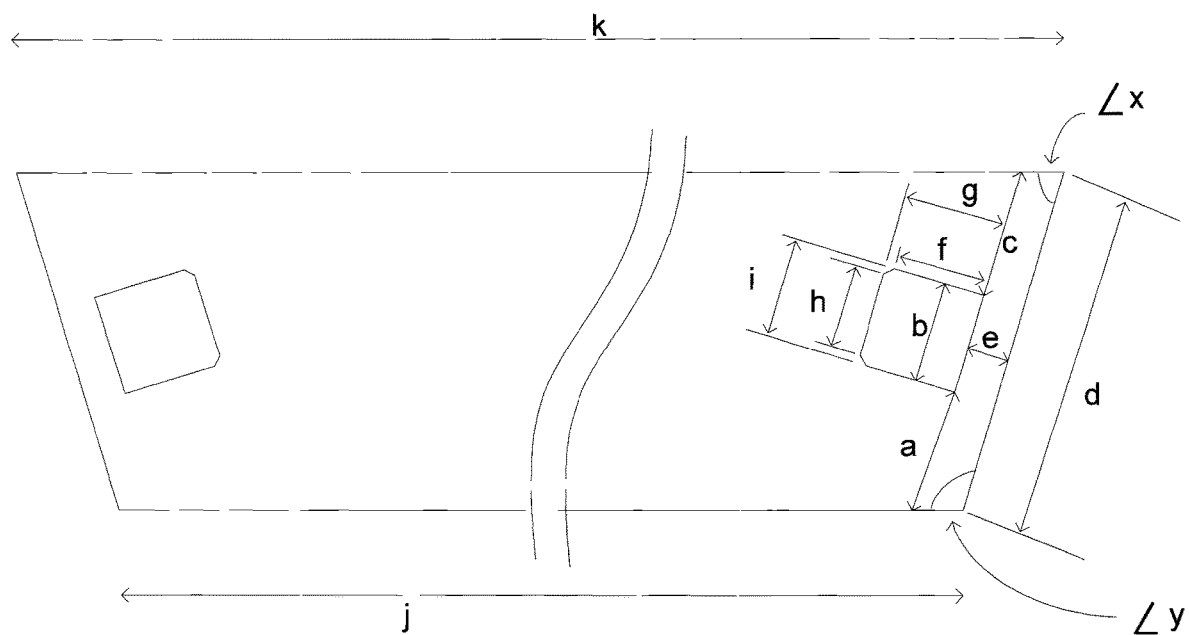
FIG. 18B is a side view used to show dimensions of an elongated strut for the geodesic structure of FIG. 17, in accordance with an embodiment of the invention.

FIGS. 17 and 18A-18B will now be discussed, providing an exemplary geodesic structure along with exemplary dimensions of discontinuous rings, fasteners and elongated struts that may be utilized, in accordance with embodiments of the invention. Other dimensions for the components may be utilized.

FIG. 17 is a top view showing a geodesic frame connector system that may be constructed using geodesic hub connectors and/or elongated struts described herein, in accordance with an embodiment of the invention. FIG. 18A is an exploded perspective view of a geodesic dome hub connector, used to show exemplary dimensions, in accordance with an embodiment of the invention. FIG. 18B is a side view of an elongated strut, used to show exemplary dimensions, in accordance with an embodiment of the invention.

Referring to FIG. 17, geodesic frame system may be used for constructing an icosahedron geodesic dome structure having a generally circular footprint of 152 inches in diameter with a center-height of 76 inches. As shown in this particular 2V embodiment (the term 'nV' being the number of division of a triangle within the structure according to the relation nV=$n^2$, here four divisions), geodesic hub connectors 100', for example, described above with respect to FIGS. 3-4 and 7-9, may be utilized. Elongated struts, for example, elongated struts 300 discussed above with respect to FIGS. 6, 7 and 8A-8B may be utilized, as shown in FIG. 17. In this embodiment, two particular strut types (i.e., struts having differing dimensions) may be utilized: strut type A shown in solid lines, and strut type B shown in broken lines. Thus, the broken lines of FIG. 17 are not meant to depict hidden lines, but rather to distinguish between the two strut types, and to show placement of the two strut types in the geodesic frame system of FIG. 17.

As shown, the geodesic frame system of FIG. 17 may include 26 geodesic hub connectors, for example geodesic dome hub connector 100' described above. Further, the geodesic frame system may include thirty five of strut type A, and thirty of strut type B. The hub connectors 100', strut type A and strut type B may be placed as shown in FIG. 17. For clarity purposes, the hub connectors 100' and elongated struts A and B are representative only, lacking detail described above.

As shown in FIG. 18A, the geodesic hub connector 100' may comprise discontinuous rings having an inner diameter 'id' of 1 inch, and an outer diameter 'od' of 3 inches, with a thickness 'h' of ½ inch, where the discontinuous ring may be formed from steel, brass or stainless steel. The discontinuity 'w' within the discontinuous ring may be 0.13 inch. The openings along the upper face of the discontinuous ring may be 'fw' of ⅜ inch, with a 16 threads per inch (tpi) threading, where a fastener may have an outer diameter of ⅜ of an inch, threaded at 16 tpi, and may be ⅝ inch long. Placement of the openings along the face of the discontinuous ring is not crucial, and many placements may be utilized while retaining at least some of the advantages described herein. In one embodiment, the openings may be spaced equally within a concentric circle centered along the discontinuous ring face, the concentric circle having a diameter of 2 inches. Other placement of the openings may be used. Though dimensions aren't shown for the second discontinuous ring of FIG. 18A, it will be appreciated that similar dimensions may be utilized. In some embodiments (not shown) it will be appreciated that the outer diameter of the second discontinuous ring may have a smaller diameter than that of the first discontinuous ring. In this case, the outside diameter of the second discontinuous ring may be large enough to allow the fasteners being used to contact the upper face of the second discontinuous ring when inserted, to allow for the separation of the first discontinuous ring from the second discontinuous ring.

Referring to FIG. 18B, the elongated strut opening may have upper and lower edges 'g' of approximately 1.13 inches, with a substantially parallel portion T of 1.00 inch. The upper and lower edges may thus taper inwardly along the upper and lower edges for 0.13 inches. The opening height 'i' may be 1.25 inches, with the height 'h' at the inward most point of the tapered edges being 1.00 inch. The 'h' dimension may be centered within the dimension. The opening upper edge may be spaced 'c' approx. 1.00 inch from the top of the elongated strut, and spaced 'a' 0.75 inch from the bottom of the strut. The opening may be spaced 'e' of 0.40 inch from the end of the strut. The strut end may have a length of 'd' 3.00 inches. Not shown in FIG. 18, the elongated struts may be ⅛ inch thick.

Angles 'x' and 'y' as well as lengths 'j' and 'k' of the elongated strut of FIG. 18B may depend on the particular strut being used for the geodesic structure. For the structure being described in FIG. 17, an icosahedron of circular footprint of 152 inches in diameter with a height of 76 inches, two particular struts may be used. Thirty five pieces of a strut type A, and thirty pieces of a strut type B. Strut type A may have the above-discussed dimensions, with an inner length 'j' of 44.85 inches and outer length 'k' of 46.71 inches, with angle 'x' being 72 degrees and angle 'y' being 108 degrees. Strut type B may have the above-discussed dimensions, but with an inner length 'j' of 39.64 inches and outer length 'k' of 41.28 inches, with angle 'x' being 74 degrees and angle 'y' being 106 degrees.

The elongated struts of FIG. 17 include second openings, as described above with respect to the elongated struts of FIGS. 5 and 6. The dimensions for the second opening aren't specifically set forth in FIG. 18B, however, may be the same dimensions, and spaced in an analogous fashion from the second end, as shown for the first opening of the elongated strut.

The embodiment of FIGS. 17 and 18A-18B are described as using the geodesic hub connector 100'. It will be appreciated that in addition or in the alternative, other geodesic hub connectors may be utilized, for example, the geodesic hub connectors 100 (FIG. 1), 1000 (FIG. 10A), 1000' (FIG. 11), 1000" (FIG. 13A), 1400 (FIG. 14) and 1600 (FIG. 16). Thus, any combination of the various geodesic hub connectors described herein may be utilized, with the particular geodesic hub connector configuration having similar dimensions as the hub connector 100' described. The embodiment of FIGS. 17 and 18A-18B are described as using the elongated strut 300 of FIG. 6, however, it will be appreciated that the elongated strut 200 (FIG. 5) may in addition, or in the alternative, be utilized.

Figure 19A:
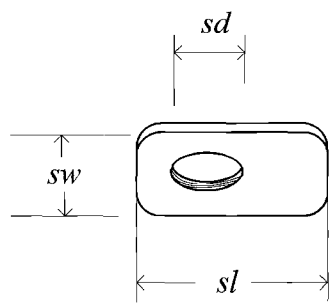
FIG. 19A is a perspective view used to show exemplary dimensions of a separator piece that may be utilized in some configurations of a geodesic hub connector, in accordance with an embodiment of the invention.
Figure 19B:
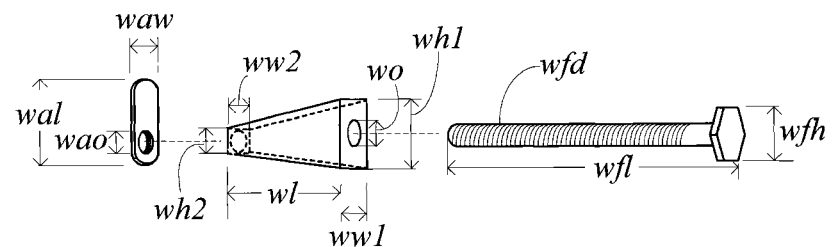
FIG. 19B is a perspective exploded view used to show exemplary dimensions of a wedge, wedge anchor and wedge fastener that may be used in configurations of a geodesic hub connector, in accordance with an embodiment of the invention.

FIGS. 19A and 19B are perspective view of components described herein, showing exemplary dimensions for such components, for example, as may be used in a geodesic structure like that shown in FIG. 17, in accordance with embodiments of the invention. Other dimensions for the components may be utilized. FIG. 19A illustrates a separator piece, for example the separator piece 1425 or 1420 of FIG. 14, in accordance with an embodiment of the invention. FIG. 19B illustrates an exemplary wedge, wedge anchor and wedge fastener, for example wedge 1615, wedge anchor 1650 and wedge fastener 1640 described above with respect to FIG. 16, in accordance with an embodiment of the invention.

As shown in FIG. 19A, the separator piece may have a separator piece length 'sl' of 1.00 inches, a separator piece width 'sw' of ½ inch, and the opening 'sd' may be ¼ inch in diameter having female threading (i.e., 20 tpi). Where the separator piece extends beyond the outside perimeter of the discontinuous ring pair, the separator piece length 'sl' may be 2½ inches. Not shown in FIG. 19A, the thickness of the separator piece may be ⅛ inch. Other dimensions may be selected depending on the particular configuration and size of the geodesic dome structure.

As shown in FIG. 19B, a wedge anchor has a wedge anchor length 'war of 1.00 inch, a wedge anchor width 'waw' of ½ inch, and a wedge anchor opening 'wao' diameter of ¼ inch having female threading (i.e., 20 tpi). The wedge has a wedge length 'wl' of 1.00 inch, a wedge end width 'ww1' and height 'wh1' of ½ inch and ½ inch, respectively. Further, the wedge, at an end proximate the wedge anchor has a second wedge width 'ww2' and second wedge height 'wh2' of ¼ inch and ¼ inch, respectively. The wedge has a wedge opening 'wo' diameter of ¼ inch, and is shown unthreaded. The wedge fastener has a wedge fastener length 'wfl' of 2¼ inch, with a wedge fastener diameter 'wfd' of ¼ inch having male threading (i.e., with 20 tpi), and the diameter of the wedge fastener head 'wfh' may be ⁷⁄₁₆ inch (here, shown as a hex bolt). Other dimensions may be selected depending on the particular configuration and size of the geodesic dome structure.

Though the wedge is shown tapered on all four sides from the end away from the wedge anchor to the end towards the wedge anchor, it will be appreciated that the tapering may instead occur in only the wedge height (i.e., 'wh1' and 'wh2') dimensions, where the wedge width may remain uniform along the major axis of the wedge. Additionally, it will be appreciated that the bottom edge of the wedge may meet the wedge ends at 90 degree angles, where the taper occurs along the top edge of the wedge.

Separator pieces being flanged nuts are described herein, for example, at 1025, 1030 (FIG. 10A), and 1355, 1360 (FIG. 13A). The threading of those separator pieces may be female threading, compatible with that of the fastener threading used therewith, for example, ⅜ inch threading at 16 threads per inch (tpi). The hex nut portions may be ⁹⁄₁₆ inch wide, with a height of approximately ⅓ inch. The flange portion may have a diameter of approximately ¾ inch, with a flange thickness of approximately ¹⁄₃₂ inch. Flanged nuts having other dimensions may be utilized. Allen fasteners have been described herein, for example, fasteners 130 (FIG. 1), 130a-130d (FIG. 3), 1055, 1060 (FIG. 10A), and 1435, 1440 (FIG. 14). Such fasteners may have a length of ⅝ inch, and have a ⅜ inch 16 tpi male threading. Other dimensions may be utilized. Fasteners 1325, 1330 (FIG. 13) are described as having both right handed and left handed male threading. Such threading may be ⅜ inch 16 tpi. The fasteners 1325, 1330 may be 1⅛ long, where the right-handed threading and left handed threading occurs for approximately ½ inch from their respective end of the fastener. Other dimensions may be utilized.

The openings of the elongated strut may be different shapes and dimensions, accounting for the cross section of the hub connector being captured by the opening. Thus, though the cross section 140 or 140' (FIGS. 2, 4) of the discontinuous ring pair is shown to be rectangular, the cross section of the ring pair may instead be square, hexagonal (or of some other polygon, regular or irregular), or may be round.

Figure 20:
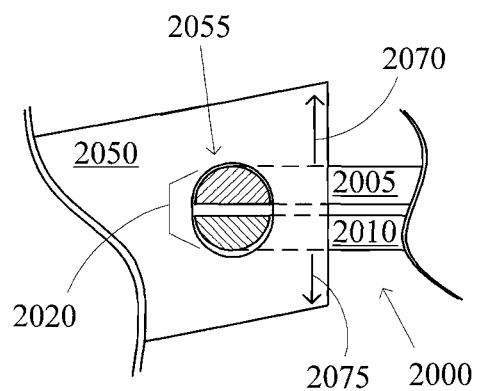
FIG. 20 Illustrates a simplified partial-sectional view showing the coupling of a hub connector having a circular cross-section with an elongated strut, in accordance with an embodiment of the invention.

FIG. 20 Illustrates a simplified partial-sectional view showing a the coupling of a hub connector having a circular cross-section with an elongated strut, in accordance with an embodiment of the invention. The sectional view shown in FIG. 20 may be similar to the sectional view of the hub connector 100' shown in FIGS. 8A-8D, there taken along A-A. It is a partial sectional view as it includes only part of the geodesic dome hub connector. Thus, for clarity, fasteners, discontinuous ring openings, and the right half of the discontinuous ring pair are not shown.

As shown in FIG. 20, a geodesic dome hub connector 2000 may include first and second discontinuous rings 2005, 2010, respectively, that may form a discontinuous ring pair. The cross sections of each discontinuous ring 2005, 2010 are each semi-circular. The discontinuity of the discontinuous ring pair thus exposes a discontinuous ring pair cross section 2020, here formed from the half-circle cross sections of the first and second discontinuous rings 2005, 2010. An elongated strut 2050 is shown, having an elongated strut opening 2055. As shown, the elongated strut opening is similar in shape to the discontinuous ring pair cross section 2020, but slightly elongated. As a fastener (not shown) is inserted into the hub connector, the first and second discontinuous rings are forced apart in the directions 2070, 2075 respectively. An upper surface of the first discontinuous ring 2005 and a lower surface of the second discontinuous ring 2010 may then contact respective upper and lower edges of the elongated strut opening, 2055, thereby securing the hub connector 2000 within the elongated strut 2050.

Thus, the discontinuous rings may have a non-rectangular cross section, where the first discontinuous ring would have a cross section consistent with the upper portion of the elongated strut opening, and the second discontinuous ring having a cross section consistent with the lower portion of the strut opening. The elongated strut opening may be shaped similarly with the ring pair cross section, but slightly elongated. Upon separation of the first and second discontinuous rings by insertion of the fastener, the discontinuous ring pair surfaces contact the respective upper and lower edges of the elongated strut opening to create a friction fit to prevent the hub connector from becoming disengaged from the elongated strut.

It will be appreciated that the first discontinuous ring may have a different cross section than the second discontinuous ring, where the elongated strut opening is similar to the cross section of the discontinuous ring pair formed by the first and second discontinuous rings. Thus, the upper portion of the elongated strut opening may be similar to the first discontinuous ring cross section, with the lower portion of the elongated strut opening that may be similar to the second discontinuous ring cross section.

It will additionally be understood that the elongated strut opening need not be the same general shape as the cross section formed by the discontinuous ring pair, while still achieving at least some advantages of the invention. For example, where the discontinuous ring pair cross section is substantially circular, as in FIG. 20, the elongated strut opening may be rectangular, for example, similar to the elongated strut opening 215 of FIG. 5. In this case, the top curve of the first discontinuous ring, and the bottom of the second discontinuous ring, may still contact the respective upper and lower edges of the strut opening upon insertion of the fastener. Further the outer perimeter of the discontinuous ring pair may contact a side of the elongated strut rectangular opening. Although the discontinuous ring surfaces are not in contact with the elongated strut opening along a substantial portion of the strut opening, a friction fit between the hub connector and elongated strut may still be achieved.

Figure 21:
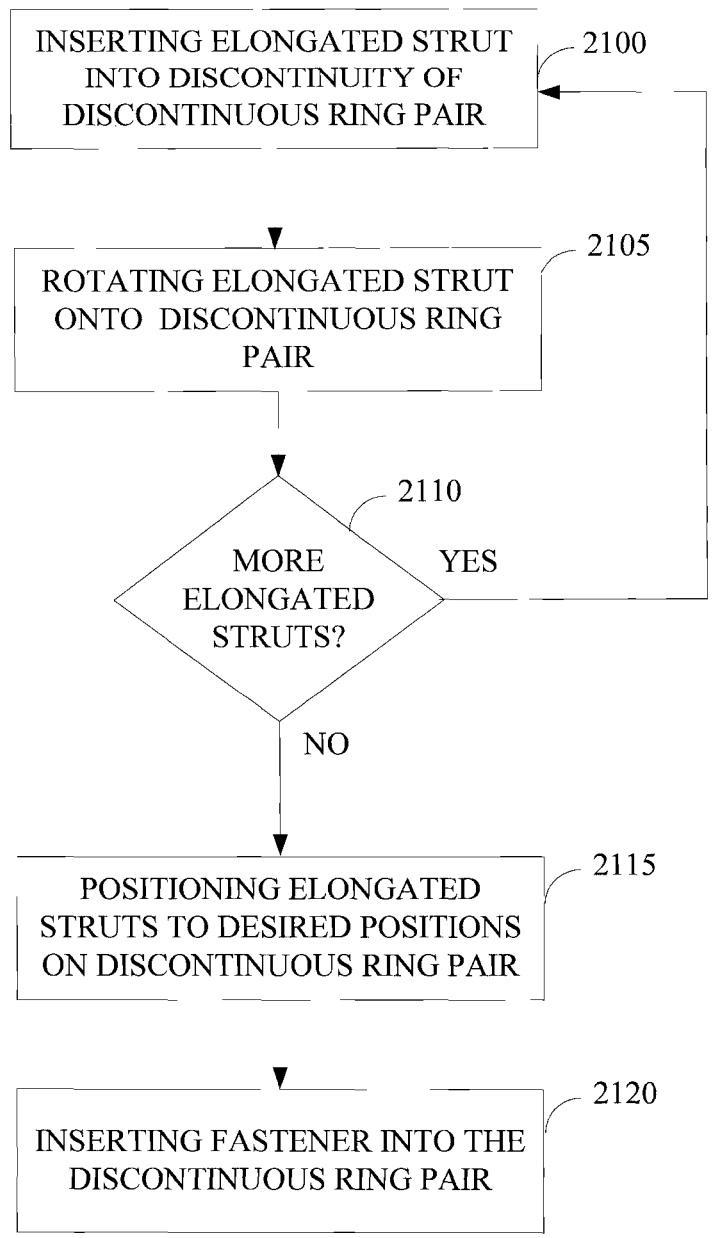
FIG. 21 is a flowchart showing use of geodesic hub connectors and elongated struts in constructing a geodesic framing system, in accordance with an embodiment of the invention.

FIG. 21 is a flowchart showing use of geodesic hub connectors and elongated struts in a geodesic framing system, in accordance with an embodiment of the invention.

As shown at step 2100, an elongated strut is inserted in the discontinuity of the discontinuous ring pair. This may be accomplished, for example, in the fashion described with respect to FIG. 7, showing the elongated strut 300 being inserted into the hub connector 100'. A similar insertion may be accomplished with the hub connectors 100 (FIG. 1), 1000 (FIG. 10A), 1000' (FIG. 11), 1000" (FIG. 13A), 1400 (FIG. 14) and 1600 (FIG. 16). The elongated strut may be, for example, the elongated strut 200 (FIG. 5), 300 (FIG. 6) or 2050 (FIG. 20). As shown at step 2105, the discontinuous ring pair may be rotated through the elongated strut opening. This may be accomplished, for example, as described above with respect to FIG. 7, where the rotating may include any combination of capturing the discontinuous ring pair within the elongated strut by rotating the discontinuous ring pair, or by threading the elongated strut onto the discontinuous ring pair (i.e., rotating the elongated strut onto the discontinuous ring pair).

It may be determined whether there are additional elongated struts to be coupled with the geodesic dome hub connector, at 2110. This may be determined, for example, by a person constructing the structure. Where there are additional elongated struts to be connected, flow returns to step 2100. Where there are no further elongated struts, flow continues to 2115, with the positioning of the elongated strut(s) to desired positions along the discontinuous ring pair. Desired positions may be spacing elongated struts equally along the discontinuous ring pair, for example, as shown at FIGS. 9, 12 and 17. Thus, the desired positions may be to allow the elongated strut to be coupled with additional hubs/elongated struts of the structure. Additionally, the positioning may include additional rotation of the discontinuous ring pair, for example, to avoid an elongated strut from obstructing a discontinuous ring opening, for example, as shown at FIG. 12.

As shown at step 2120, a fastener (or multiple fasteners) may be inserted into the discontinuous ring pair. Such insertion causes the discontinuous rings of the discontinuous ring pair to separate (i.e., be forced apart), thereby securing (and in some embodiments, aligning) elongated struts being coupled by the geodesic hub connector, for example, as shown at FIGS. 8A-8D, FIGS. 9, 12, 15, and 17. Inserting the fastener may include inserting the fastener through an opening in the first discontinuous ring, for example, as shown at FIGS. 1, 3, 8A-8D, 10A-10B, 11, 13A-13B and 14. Such insertion into the discontinuous ring pair may include insertion through a wedge into a wedge anchor, for example, as shown at FIG. 16.

It will be appreciated that in some cases, it may be desirable to repeat steps 2100-2115 multiple times, thereby assembling multiple hubs within the structure, before carrying out step 2120 of inserting the fasteners into the various discontinuous ring pairs. Thus, multiple hubs of the structure may be loosely assembled through steps 2100-2115, before the insertion of the fastener(s) at 2120 secure (and in some embodiments, align) the various discontinuous ring pairs (i.e., geodesic hub connectors) with the elongated struts with which they are coupled.

It will be appreciated that the various discontinuous rings, elongated struts, separator pieces (i.e., that aren't flanged nuts), wedges and wedge anchors of the various embodiments, may be cut from stock, using a computer guided laser or plasma cutter, by hand, or by other means of creating such components. Instead, some or all of such components may be poured metal into forms or molds to create the desired component. The various fasteners may be any threaded screw or bolt capable of accomplishing the desired insertion to cause separation of the first and second discontinuous rings.

It will be appreciated that the various discontinuous rings, elongated struts, separator pieces, wedges and wedge anchors of the various embodiments may be formed from any metal having strength characteristics for the desired geodesic dome structure being created. Therefore, such components may be formed from steel, stainless steel, brass, iron or other metals, or where the various stress requirements allow, from other materials as plastic, wood or even cardboard (i.e., in the case of a child's toy). The material may be chosen based on the size of the geodesic structure being created, accounting for the environmental conditions, as well as the covering or skin to be used for the geodesic structure. Threaded wood inserts may provide the desired threading where threaded fasteners are utilized.

Various configurations of geodesic dome hub connectors are described herein. In some cases, it may be desirable to utilize a single uniform type of hub connector throughout an entire dome, for simplicity in assembly. In other cases, it may be desirable to utilize geodesic dome hub connectors having different configurations, for example, where one connector may be more convenient for fastener insertion at a particular location of the geodesic dome structure, or where a particular connector works better because of, for instance a large number of elongated struts being coupled thereby. Thus, a geodesic structure may include any combination of the various hub connector configurations, as well as any combination of the elongated strut configurations described herein. Further, it will be appreciated that in some embodiments, the number of fasteners may be as little as 1, and an upper limit may be determined based on the particulars of a situation including the diameter of the discontinuous ring being used. A typical number of fasteners utilized may be 3 to 6. Other numbers of fasteners may be used. In addition, the number of openings along the face of a discontinuous ring may be the same as, or greater than the number of fasteners used. Using additional openings may allow for avoiding strut obstructions, or in some cases in the same dome structure, the number of fasteners utilized at a particular hub may be reduced, for example, because of the location of the particular hub or the number of elongated struts being joined, resulting in a greater number of openings than fasteners for one or more geodesic dome hub connectors.

Though the example of FIG. 17 describes a geodesic dome frame connector system that is an icosahedron shape, it will be appreciated that the hub connectors and/or elongated struts described herein may be utilized in a wide variety of structures, whether geodesic or otherwise.

The various embodiments show first and second discontinuous rings that are substantially the same size. It will be appreciated that the discontinuous rings being used may have differing outer diameters/perimeters, while still achieving at least some of the advantages described herein. In addition, the various embodiments show the first and second discontinuous rings as having the same thickness, however, it will be appreciated that the thicknesses of the first and second discontinuous ring may differ in a hub connector, while achieving at least some of the advantages discussed herein. It will be appreciated as well, that though the various fasteners within a hub connector are shown with uniform sizing and threading, the fasteners may instead be of different sizes (i.e., widths and/or lengths) and/or threaded differently while still achieving at least some advantages discussed herein. In this case, the openings into which or through which the fastener is inserted would be sized appropriately for the dimensions of the fastener, and any separator piece or discontinuous ring openings may be compatibly threaded for its respective fastener. Additionally, the sizing (i.e., diameters, length, width, threading, and thickness) of the various components like hub connectors, struts, fasteners etc. may be determined accounting for the size, shape and use of the particular structure being formed, the material the particular component is being formed from, and a maximum number of elongated struts being coupled together.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

I claim:

1. A geodesic frame connector system for a geodesic frame, comprising:

a discontinuous ring pair comprising a first discontinuous ring and a second discontinuous ring,
the first discontinuous ring having a first discontinuous ring upper face and a first discontinuous ring lower face, and a first discontinuity, the first discontinuous ring upper face including an opening extending through the first discontinuous ring, and having a first discontinuous ring inner ring perimeter and a first discontinuous ring outer ring perimeter, and
the second discontinuous ring having a second discontinuous ring upper face and a second discontinuous ring lower face, a second discontinuity, and a second discontinuous ring inner ring perimeter and a second discontinuous ring outer ring perimeter,
where one of the first discontinuous ring lower face and upper face is placed adjacent one of the second discontinuous ring lower face and upper face such that the first discontinuity and the second discontinuity are substantially aligned to form aligned discontinuities;

a fastener having a cross section smaller than the opening; and at least two elongated struts, each of the at least two elongated struts including a first end and a second end and a strut opening proximate the first end, each strut opening of the at least two elongated struts being greater than a cross section of the discontinuous ring pair and including an upper edge and lower edge;

where each of the at least two elongated struts is capable of being rotationally coupled with the discontinuous ring pair by inserting the strut opening of each of the at least two elongated struts through the aligned discontinuities, thereby allowing the at least two elongated struts to be positioned at respective desired positions along the discontinuous ring pair, and where insertion of the fastener in the opening of the first discontinuous ring causes the second discontinuous ring to be forced away from the first discontinuous ring causing the first discontinuous ring upper face to contact the upper edge of each elongated strut opening of the at least two elongated struts, and the second discontinuous ring lower face to contact the lower edge of each elongated strut opening of the at least two elongated struts.

2. The geodesic frame connector system of claim 1, where the opening in the first discontinuous ring is a round threaded opening, and the fastener has a round cross section and is compatibly threaded, and wherein
the insertion of the fastener into the opening includes turning the fastener into the opening to cause the fastener to contact the second discontinuous ring, thereby forcing the second discontinuous ring from the first discontinuous ring.

3. The geodesic frame connector system of claim 2, where the fastener is a first threaded fastener and the round threaded opening is a first round threaded opening, and where the first discontinuous ring upper face includes a second round threaded openings extending through the first discontinuous ring, and further including a second threaded fasteners having a round cross section and being compatibly threaded with the second round threaded opening, and wherein
turning the fastener includes turning each of the first and second threaded fasteners into respective first and second round threaded openings to cause each of the first and second threaded fasteners to contact the second discontinuous ring, thereby forcing the second discontinuous ring from the first discontinuous ring.

4. The geodesic frame connector system of claim 1, where the opening is a first discontinuous ring opening, the second discontinuous ring upper face including a second discontinuous ring opening extending through the second discontinuous ring, and where the fastener has a round cross section smaller than the second discontinuous ring opening and includes first and second ends, the fastener having one of a right-handed and left-handed thread portion proximate the first end, and the other of a right-handed and left-handed thread portion proximate the second end, and further including
a first separator piece having a face dimension greater than the first discontinuous ring opening and a first separator opening threaded in a right-handed thread compatible with the right-handed thread of the fastener, and
a second separator piece having a face dimension greater than the second discontinuous ring opening and a second separator opening threaded in a left-handed thread compatible with the left-handed thread of the fastener, and wherein
first separator piece and second separator piece are threaded onto respective compatible ends of the fastener and sandwiched between the first and second discontinuous rings with one fastener end extending into the first discontinuous ring opening and the other fastener end extending into the second discontinuous ring opening, where insertion of the fastener includes turning the fastener to cause the first and second separator pieces to extend away from one another, threreby contacting corresponding faces of the discontinuous rings to force the first discontinuous ring away from the second discontinuous ring.

5. The geodesic frame connector system of claim 4, where the first separator piece is a first flange nut, and the second separator piece is a second flange nut.

6. The geodesic frame connector system of claim 1, where the first discontinuous ring upper face includes a plurality of openings extending through the first discontinuous ring, and further including a plurality of fasteners each having a diameter smaller than a compatible opening of the plurality of openings, and wherein
insertion of each of the plurality of fasteners in a compatible opening of the plurality of openings causes the plurality of fasteners to contact the second discontinuous ring, thereby forcing the second discontinuous ring from the first discontinuous ring.

7. The geodesic frame connector system of claim 1, where the fastener has a round cross section and is threaded, and further including
a separator piece sandwiched between the first and second discontinuous rings, the separator piece having a face dimension greater than the diameter of the first ring opening and including a threaded separator opening compatible with the threaded fastener, and wherein
insertion of the fastener includes turning the fastener in the separator opening, causing the separator piece to contact the first discontinuous ring while the fastener contacts the second discontinuous ring thereby forcing the second discontinuous ring away from the first discontinuous ring.

8. The geodesic frame connector system of claim 7, where the separator piece extends beyond the outside perimeters of the first and second discontinuous rings.

9. The geodesic frame connector system of claim 7, where the separator piece is a flanged nut, with the nut portion sized to fit within the first ring opening and the flanged portion having a face dimension greater than the diameter of the first ring opening, and wherein
the insertion of the fastener into the opening includes turning the fastener into the flanged nut to draw the nut portion into the ring opening with the flanged portion preventing the flanged nut from completely entering the first ring opening, while causing the fastener to contact the second discontinuous ring, thereby forcing the second discontinuous ring from the first discontinuous ring.

10. The geodesic frame connector system of claim 9, where the first ring opening is elongated along a major axis allowing the flanged nut to travel along the major axis without completely entering the first ring opening, and wherein
the insertion of the fastener includes positioning the flanged nut to a desired location along the major axis of the first ring opening.

11. The geodesic frame connector system of claim 1, wherein each strut opening of the at least two elongated struts is rectangular.

12. The geodesic frame connector system of claim 1, wherein the upper and lower edges of each strut opening of the at least two elongated struts include a substantially parallel portion proximate the respective elongated strut first end, and an inwardly tapered portion away from the respective elongated strut first end, where insertion of the fastener causes the first discontinuous ring upper face and the second discontinuous ring lower face to become substantially seated within the substantially parallel portions of the elongated strut openings of the at least two elongated struts.

13. The geodesic frame connector system of claim 1, where the strut opening of each elongated strut of the at least two elongated struts is a first strut opening, and wherein each elongated strut of the at least two elongated struts includes a second strut opening proximate the second end, with each second strut opening of the at least two elongated struts being greater than a cross section of the discontinuous ring pair and including an upper edge and lower edge.

14. The geodesic frame connector system of claim 1 wherein a diameter of the first discontinuous ring inner ring perimeter is substantially equal to a diameter of the second discontinuous ring inner ring perimeter, and a diameter of the first discontinuous ring outer ring perimeter is substantially equal to a diameter of the second discontinuous ring outer ring perimeter.

15. A geodesic frame connector system for a geodesic frame, comprising:
- a discontinuous ring pair comprising a first discontinuous ring having a first discontinuous ring upper face and a first discontinuous ring lower face, and a first discontinuous ring inner ring perimeter and a first discontinuous ring outer ring perimeter and a second discontinuous ring having a second discontinuous ring upper face and a second discontinuous ring lower face, and a second discontinuous ring inner ring perimeter and a second discontinuous ring outer ring perimeter, the first discontinuous ring lower face being adjacent the second discontinuous ring upper face, and the first discontinuous ring inner ring perimeter and the second discontinuous ring inner ring perimeter defining a discontinuous ring pair inner opening;
- a wedge portion sandwiched between the lower face of the first discontinuous ring and the upper face of the second discontinuous ring such that the wedge portion extends beyond at least one of the first and second discontinuous ring outer perimeters, the wedge portion having a wedge portion opening extending through the wedge portion along a wedge portion major axis,
- a wedge anchor portion, including a threaded wedge anchor opening, inserted in the discontinuous ring pair inner opening with the wedge anchor opening substantially aligned with the wedge portion opening;
- a fastener having a head portion with a cross section greater than the wedge portion opening and a threaded portion compatible with the threaded wedge anchor opening;
- at least two elongated struts, each strut of the at least two elongated struts including a first end and a second end and a strut opening proximate the first end, each strut opening of the at least two elongated struts being greater than a cross section of the discontinuous ring pair and including an upper edge and lower edge; wherein
- each elongated strut of the at least two elongated struts is capable of being coupled with the discontinuous ring pair, by inserting the discontinuous ring pair through each strut openings of the at least two elongated struts, and where
- insertion of the fastener through the wedge opening and turned through the wedge anchor opening draws the wedge portion toward the wedge anchor portion, thereby causing the first discontinuous ring upper face to contact the upper edge of each elongated strut opening of the at least two elongated struts, and the second discontinuous ring lower face to contact the lower edge of each elongated strut opening of the at least two elongated struts to separate the first discontinuous ring from the second discontinuous ring.

16. The geodesic frame connector system of claim 15, wherein the wedge portion is a first wedge portion, and the wedge anchor portion is a first wedge anchor portion, and the fastener is a first fastener, and further including:
- a second wedge portion sandwiched between the lower face of the first discontinuous ring and the upper face of the second discontinuous ring having a second wedge portion major axis such that the second wedge portion extends beyond at least one of the first and second discontinuous ring outside perimeters, the second wedge portion having a second wedge portion opening extending through the second wedge portion along second wedge portion major axis,
- a second wedge anchor portion, including a second threaded wedge anchor opening, inserted in the discontinuous ring pair inner opening with the second wedge anchor opening substantially aligned with the second wedge portion opening;
- a second fastener having a second head portion with a cross section greater than the second wedge portion opening and a second threaded portion compatible with the second threaded wedge anchor opening, wherein
- insertion of the fastener includes insertion of the second fastener through the second wedge opening and turned through the second wedge anchor opening to draw the second wedge portion toward the second wedge anchor portion.

17. A method for constructing a geodesic frame using a geodesic frame system, comprising:
- aligning discontinuities of a first and second discontinuous rings that form a discontinuous ring pair to form aligned discontinuities, with the aligned discontinuities exposing a cross section face of the discontinuous ring pair;
- inserting a first end of a first elongated strut into the aligned discontinuities of the discontinuous ring pair such that a first elongated strut opening aligns with the cross section face;
- rotating the discontinuous ring pair through the first elongated strut opening;
- inserting a first end of a second elongated strut into the aligned discontinuities of the discontinuous ring pair such that a second elongated strut opening aligns with the cross section face;
- positioning the first and second elongated struts to desired respective positions along the discontinuous ring pair; and
- inserting a fastener into the discontinuous ring pair, to force the first discontinuous ring away from the second discontinuous ring, such that a first discontinuous ring upper face contacts an upper edge of the first elongated strut opening and an upper edge of the second elongated strut opening, and a second discontinuous ring lower face contacts a lower edge of the first elongated strut opening and a lower edge of the second elongated strut opening.

18. The method of claim 17, where the inserting the fastener includes inserting the fastener into an opening of the first discontinuous ring to force the first discontinuous ring away from the second discontinuous ring.

19. The method of claim 17, where the inserting the fastener includes inserting the fastener through a wedge portion opening and into a wedge anchor, the wedge portion being sandwiched between the first and second discontinuous rings and the wedge anchor being placed in a discontinuous ring pair inner opening defined by the inner perimeters of the first and second discontinuous ring pair; and wherein
- the inserting of the fastener draws the wedge portion toward the wedge anchor portion to force the first discontinuous ring from the second discontinuous ring.

* * * * *

UNITED STATES PATENT AND TRADEMARK OFFICE
CERTIFICATE OF CORRECTION

| | |
|---|---|
| PATENT NO. | : 11,486,129 B1 |
| APPLICATION NO. | : 16/922478 |
| DATED | : November 1, 2022 |
| INVENTOR(S) | : Michael E. Garvey |

It is certified that error appears in the above-identified patent and that said Letters Patent is hereby corrected as shown below:

On the Title Page

Item (71), after "Applicant: Michael E. Garvey," delete "Schereville" and substitute therefore "Schererville"

Item (72), after "Inventor: Michael E. Garvey," delete "Schereville" and substitute therefore "Schererville"

Signed and Sealed this
Seventh Day of March, 2023

Katherine Kelly Vidal
*Director of the United States Patent and Trademark Office*